United States Patent
Krishnaswamy et al.

(10) Patent No.: US 12,474,270 B2
(45) Date of Patent: Nov. 18, 2025

(54) BIOLOGICAL SENSING AND COMMUNICATION USING OPTOGENETICS AND ELECTRONICS

(71) Applicant: WISCONSIN ALUMNI RESEARCH FOUNDATION, Madison, WI (US)

(72) Inventors: Bhuvana Krishnaswamy, Madison, WI (US); Megan N. Mcclean, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 1011 days.

(21) Appl. No.: 17/480,654

(22) Filed: Sep. 21, 2021

(65) Prior Publication Data
US 2022/0091040 A1    Mar. 24, 2022

Related U.S. Application Data

(60) Provisional application No. 63/081,853, filed on Sep. 22, 2020.

(51) Int. Cl.
*G01N 21/64* (2006.01)
*B01L 3/00* (2006.01)
(Continued)

(52) U.S. Cl.
CPC .... *G01N 21/6458* (2013.01); *B01L 3/502715* (2013.01); *C12M 21/02* (2013.01);
(Continued)

(58) Field of Classification Search
CPC ............. G01N 21/6458; G01N 33/533; B01L 3/502715; B01L 2300/0663;
(Continued)

(56) References Cited

U.S. PATENT DOCUMENTS

| 2010/0167263 A1* | 7/2010 | Groll ............... G01N 33/54393 422/69 |
| 2010/0291703 A1* | 11/2010 | Meng .................. G01N 21/645 422/69 |
| 2021/0181146 A1* | 6/2021 | Stowell ............. G01N 27/4141 |

OTHER PUBLICATIONS

Adeniran, A., et al., "Yeast-based biosensors: design and applications," FEMS Yeast Research (2015) 15:1-15.
(Continued)

*Primary Examiner* — Brian J. Sines
(74) *Attorney, Agent, or Firm* — Andrus Intellectual Property Law, LLP

(57) ABSTRACT

Devices, systems and methods for biological sensing and communication using optogenetics and electronics are described. One example method includes generating a light beam incident on multiple regions in a device, wherein each region comprises an optogenetic system to generate, upon interacting with the light beam, biosensors, wherein an interaction between the biosensors and stimulus molecules in each region is associated with a threshold for a production of an output molecule or an alteration of an output property of the output molecule, the biosensors, or the stimulus molecules, wherein the production or the alteration is based on a value associated with an information source, detecting an output received from one or more of the multiple regions corresponding to the output molecule or the output property in that region, and generating an electric signal associated therewith, and processing the electrical signal to determine the value associated with the information source.

19 Claims, 7 Drawing Sheets

(51) Int. Cl.
    C12M 1/00      (2006.01)
    C12N 1/16      (2006.01)
    C12N 15/81     (2006.01)
    C12R 1/865     (2006.01)
    G01N 33/533    (2006.01)
    H04B 10/80     (2013.01)
    H04B 13/00     (2006.01)

(52) U.S. Cl.
    CPC .............. *C12M 23/22* (2013.01); *C12N 1/16* (2013.01); *C12N 15/81* (2013.01); *G01N 33/533* (2013.01); *H04B 10/80* (2013.01); *H04B 13/00* (2013.01); *B01L 2300/0663* (2013.01); *C12R 2001/865* (2021.05)

(58) Field of Classification Search
    CPC ...... B01L 2300/0636; B01L 3/502761; C12M 21/02; C12M 23/22; C12M 23/16; C12N 1/16; C12N 15/81; H04B 10/80; H04B 13/00; H04B 10/90; C12R 2001/865
    See application file for complete search history.

(56) References Cited

OTHER PUBLICATIONS

Akyildiz, I. F., et al., "Moving forward with molecular communication: From theory to human health applications," Proceedings of the IEEE (2019) 107(5):858-865.
An-Adirekkun, J. M., et al., "A yeast optogenetic toolkit (yOTK) for gene expression control in *Saccharomyces cerevisiae*," Biotechnol. Bioengineer. (2020) 117:886-893.
Anderson, J. C., et al., "Environmentally controlled invasion of cancer cells by engineered bacteria," J. Mol. Biol. (2006) 355:619-627.
Atakan, B., et al., "Single and multiple-access channel capacity in molecular nanonetworks," Nano-Net (2009) 20:14-23.
Austin, C. M., "Dynamics of molecular communication in bacteria within microfluidic environments," A Dissertation, Woodruff School of Mechanical Engineering, Georgia Institute of Technology (2016), 163 pages.
Benzinger, D., et al., "Pulsatile inputs achieve tunable attenuation of gene expression variability and graded multi-gene regulation," Nat. Commun. (2018) 9:3521.
Boyden, E. S., et al., "A history of optogenetics: the development of tools for controlling brain circuits with light," F1000 Biology Reports (2011) 3:1.
Bradley, R. W., et al., "Recognizing and engineering digital-like logic gates and switches in gene regulatory networks," Curr. Opin. Microbiol. (2016) 33:74-82.
Bugaj, L. J., et al., "High-throughput multicolor optogenetics in microwell plates," Nat. Protocols (2019) 14:2205-2228.
Chien, T., et al., "Advances in bacterial cancer therapies using synthetic biology," Curr. Opin. Syst. Biol. (2017) 5:1-8.
Dai, B., et al., "Colour compound lenses for a portable fluorescence microscope," Light: Science & Applications (2019) 8:75.
Darlington, A. P.S., et al., "Dynamic allocation of orthogonal ribosomes facilitates uncoupling of co-expressed genes," Nat. Commun. (2018) 9:695.
Einolghozati, A., et al., "Decode and forward relaying in diffusion-based molecular communication between two populations of biological agents," 2014 IEEE International Conference on Communications (2014), pp. 3975-3980.
Fang, Y., et al., "Symbol-by-symbol maximum likelihood detection for cooperative molecular communication," IEEE Transactions on Communications (2019) 67(7):4885-4899.
Farsad, N., et al., "A comprehensive survey of recent advancements in molecular communication," IEEE Commun. Surveys & Tutorials (2016) 18(3):1887-1919.
Farsad, N., et al., "Capacity limits of diffusion-based molecular timing channels with finite particle lifetime," IEEE Transactions on Molecular, Biological, and Multi-Scale Communications (2018) 4(2):88-106.
Ford, T. J., et al., "Synthetic biology expands chemical control of microorganisms," Curr. Opin. Chem. Biol. (2015) 28:20-28.
Gerhardt, K. P., et al., "An open-hardware platform for optogenetics and photobiology," Sci. Rep. (2016) 6:35363.
Gore, A. C., et al., "EDC-2: The endocrine society's second scientific statement on endocrine-disrupting chemicals," Endocrine Reviews (2015) 36:E1-E150.
Grebenstein, L., et al., "Biological optical-to-chemical signal conversion interface: A small-scale modulator for molecular communications," IEEE Transactions on NanoBioscience (2019) 18(1):31-42.
Guo, W., et al., "Molecular communications:Channel model and physical layer techniques," IEEE Wireless Communications (2016) 23(4):120-127.
He, P., et al., "Improving reliability performance of diffusion-based molecular communication with adaptive threshold variation algorithm," Int. J. Commun. Syst. (2016) 29:2669-2680.
Hiyama, S., et al., "Molecular communication: Harnessing biochemical materials to engineer biomimetic communication systems," Nano Communication Networks (2010) 1:20-30.
Jones, K. A., et al., "Recent advances in developing and applying biosensors for synthetic biology," Nano Futures (2019) 3:042002.
Kennedy, M. J., et al., "Rapid blue-light-mediated induction of protein interactions in living cells," Nat. Methods (2010) 7(12):973-977.
Khalil, A. S., et al., "Synthetic biology:Applications come of age," Nat. Rev. Genet. (2010) 11:367-379.
Kim, N.R., et al., "An experimentally validated channel model for molecular communication systems," IEEE Access (2019) 7:81849-81858.
Kolar, K., et al., "OptoBase: A web platform for molecular optogenetics," ACS Synth. Biol. (2018) 7:1825-1828.
Krishnaswamy, B., et al., "Time-elapse communication: Bacterial communication on a microfluidic chip," IEEE Transactions on Communications (2013) 61(12):5139-5151.
Krishnaswamy, B., et al., "ADMA: Amplitude-division multiple access for bacterial communication networks," IEEE Transactions on Molecular, Biological, and Multi-scale Communications (2017) 3(3):134-149.
Kuran, M. S., et al., "Modulation techniques for communication via diffusion in nanonetworks," IEEE International Conference on Communications (2011), pp. 1-5.
Kuros, J. F., et al., Computer Networking, Pearson Education Inc. (1991) 6th Ed., 889 pages.
Lavan, D. A., et al., "Small-scale systems for in vivo drug delivery," Nat. Biotechnol. (2003) 21(10):1184-1191.
Lin, X., et al., "Multiple advanced logic gates made of DNA-Ag nanocluster and the application for intelligent detection of pathogenic bacterial genes," Chem. Sci. (2018) 9:1774.
Lio, P., et al., "Opportunistic routing through conjugation in bacteria communication nanonetwork," Nano Communication Networks (2012) 3:36-45.
Liu, Z., et al., "Programming bacteria with light-sensors and applications in synthetic biology," Front. Microbiol. (2018) 9:2692.
Loessner, M. J., et al., "Construction of luciferase reporter bacteriophage A511 ::luxAB for rapid and sensitive detection of viable listeria cells," Applied and Environmental Microbiology (1996) 62(4):1133-1140.
Luo, X., et al., "Biofabrication of stratified biofilm mimics for observation and control of bacterial signaling," Biomaterials (2012) 33:5136-5143.
Luo, X., et al., "Distal modulation of bacterial cell-cell signalling in a synthetic ecosystem using partitioned microfluidics," Lab Chip (2015) 15:1842.
Mai, T. C., et al., "Event detection in molecular communication networks with anomalous diffusion," IEEE Commun. Lett. (2017) 21(6):1249-1252.

(56) References Cited

OTHER PUBLICATIONS

Mansouri, M., et al., "Light-controlled mammalian cells and their therapeutic applications in synthetic biology," Adv. Sci. (2019) 6:1800952.
Marchisio, M. A., et al., "Automatic design of digital synthetic gene circuits," PLoS Comput. Biol. 7(2):e1001083.
Mcisaac, R. S., et al., "Fast-acting and nearly gratuitous induction of gene expression and protein depletion in *Saccharomyces cerevisiae*," Mol. Biol. Cell. (2011) 22:4447-4459.
Melendez, J., et al., "Real-time optogenetic control of intracellular protein concentration in microbial cell cultures," Integr. Biol. (2014) 6:366.
Metzger, D., et al., "The human oestrogen receptor functions in yeast," Nature (1988) 334:31-36.
Miyamoto, T., et al., "Synthesizing biomolecule-based boolean logic gates," ACS Synth. Biol. (2013) 2:72-82.
Molinari, S., et al., "A synthetic system for asymmetric cell division in *Escherichia coli*," Nat. Chem. Biol. (2019) 15:917-924.
Moore, M. J., et al., "Addressing by beacon distances using molecular communication," Nano Communication Networks (2011) 2:161-173.
Moser, F., et al., "Genetic sensor for strong methylating compounds," ACS Synth. Biol. (2013) 2:614-624.
Mushnikov, N. V., et al., "Inducible asymmetric cell division and cell differentiation in a bacterium," Nat. Chem. Biol. (2019) 15:925-931.
Nguyen, C., et al., "Detection of bacillus anthracis spores from environmental water using bioluminescent reporter phage," J. Applied Microbiol. (2017) 123:1184-1193.
Pierobon, M., et al., "A physical end-to-end model for molecular communication in nanonetworks," IEEE JJournal on Selected Areas in Communications (2010) 28(4):602-611.
Pierobon, M., et al., "Information capacity of diffusion-based molecular communication in nanonetworks," Proceedings IEEE Infocom (2011) 506-510.
Pierobon, M., et al., "A systems-theoretic model of a biological circuit for molecular communication in nanonetworks," Nano Commun. Networks (2014) 5:25-34.
Prindle, A., et al., "A sensing array of radically coupled genetic 'biopixels'," Nature (2012) 481:39-44.
Rajasarkka, J., et al., "Developing a compound-specific receptor for bisphenol A by directed evolution of human estrogen receptor α," Biotechnol. Bioeng. (2011) 108:2526-2534.
Repina, N. A., et al., "At light speed: Advances in optogenetic systems for regulating cell signaling and behavior," Annu. Rev. Chem. Biomol. Eng. (2017) 8:13-39.
Russell, J. J., et al., "Non-model model organisms," BMC Biology (2017) 15:55.
Salinas, F., et al., "Optogenetic switches for light-controlled gene expression in yeast," Appl. Microbiol. Biotechnol. (2017) 101:2629-2640.
Sanseverino, J., et al., "Screening of potentially hormonally active chemicals using bioluminescent yeast bioreporters," Toxicological Sciences (2009) 107(1):122-134.
Shih, P.J., et al., "Channel codes for mitigating intersymbol interference in diffusion-based molecular communications," IEEE Global Communications Conference (GLOBECOM) (2012) 4228-4232.
Shiizaki, K., et al., "Establishment of yeast reporter assay systems to detect ligands of thyroid hormone receptors α and β," Toxicology in Vitro (2010) 24:638-644.
Siuti, P., et al., "Synthetic circuits integrating logic and memory in living cells," Nat. Biotechnol. (2013) 31(5):448-453.
Slomovica, S., et al., "Synthetic biology devices for in vitro and in vivo diagnostics," PNAS (2015) 112(47):14429-14435.
Snoek, T., et al., "Evolution-guided engineering of small-molecule biosensors," Nucl. Acids Res. (2020) 48(1):e3, 14 pages.
Stewart, C. J., et al., "Design and implementation of an automated illuminating, culturing, and sampling system for microbial optogenetic applications," J. Vis. Exp. (2017) 120:e54894.
Sweeney, K., et al., "Easy calibration of the light plate apparatus for optogenetic experiments," MethodsX (2019) 6:1480-1488.
Tamsir, A., et al., "Robust multicellular computing using genetically encoded NOR gates and chemical 'wires'," Nature (2011) 469:212-215.
Trang, P. T. K., et al., "Bacterial bioassay for rapid and accurate analysis of arsenic in highly variable groundwater samples," Environ. Sci. Technol. (2005) 39:7625-7630.
Van Der Meer, J. R., et al., "Where microbiology meets microengineering: design and applications of reporter bacteria," Nat. Rev. Microbiol. (2010) 8:511-522.
Vasconcelos, M. M., et al., "A continuous-time decision-making model for bacterial growth via quorum sensing: theory and evidence," NANOCOM '19: Proceedings of the Sixth Annual ACM International Conference on Nanoscale Computing and Communication (2019) 5:1-6.
Xiang, Y., et al., "Scaling up genetic circuit design for cellular computing: advances and prospects," Natural Computing (2018) 17:833-853.
Xu, T., et al., "High-throughput analysis of endocrine-disrupting compounds using BLYES and BLYAS bioluminescent yeast bioassays," Meth. Mol. Biol. (2020) 2081:29-41.
Yan, Q., et al., "Challenges and advances for genetic engineering of non-model bacteria and uses in consolidated bioprocessing," Front. Microbiol. (2017) 8:2060.
Zhang, K., et al., "Light-mediated kinetic control reveals the temporal effect of the Raf/MEK/ERK pathway in PC12 cell neurite outgrowth," PLoS One (2014) 9(3): e92917.

\* cited by examiner

BIOLOGICAL SENSING AND COMMUNICATION USING OPTOGENETICS AND ELECTRONICS

PRIORITY CLAIM

This application claims the benefit of U.S. Patent Application No. 63/081,853, filed Sep. 22, 2020, which is incorporated herein by reference in its entirety, including drawings.

STATEMENT REGARDING FEDERALLY SPONSORED RESEARCH

This invention was made with government support under GM128873 awarded by the National Institutes of Health. The government has certain rights in the invention.

BACKGROUND

Conventional electromagnetic-based communication systems embed information in the properties of electromagnetic (EM) waves. In contrast, molecular communication (MC) networks use molecules to encode, transmit, and receive information. At the highest level of abstraction, MC networks propagate information from a source to a destination using MC links composed of a transmitter, channel, and receiver. MC networks are suitable for communication at small scale and in environments where EM-based communication is inefficient or impossible. Microorganisms are attractive components in MC networks as they naturally use molecules and combinations of molecules, such as peptides and proteins, to communicate; they are molecular transceivers.

Microbes have evolved to rapidly sense their environmental conditions, and therefore they contain a vast array of biosensing proteins. These biosensors are often very specific, as most biosensors involve binding of an antigen on the target molecule to an active site on the biosensor having a complementary shape to the antigen that has been carefully tuned through natural selection. Typically, natural biosensors contain both sensing and reporter domains, with the reporting domain generating an intracellular signal that drives the cellular response. The natural repertoire of microbial biosensors has been further expanded by successes in protein engineering and synthetic biology. Various underlying natural biomolecular scaffolds, including biomolecular scaffolds formed from nucleic acids, such as deoxyribonucleic acid (DNA) and/or ribonucleic acid (RNA), and/or polypeptides, have been engineered to detect a broad array of inputs including small molecules and proteins with increased specificity, sensitivity, and dynamic range.

Accordingly, there is a need to develop new systems and methods for biological sensing and communications useful for a variety of different detection and diagnostic purposes.

SUMMARY

Embodiments of the present technology relate to methods, devices and systems for biological sensing and communication using optogenetics and electronics.

In an aspect, the present technology includes systems and methods for biological sensing and communication using optogenetics and electronics. In some embodiments, a method includes generating at least one light beam incident on one or more regions of a plurality of regions in a device, wherein each region comprises an optogenetic system to generate, upon interacting with the at least one light beam, a plurality of biosensors, wherein an interaction between the plurality of biosensors and a plurality of stimulus molecules in each region is associated with at least one distinct threshold for a production of an output molecule or an alteration of an output property associated with the output molecule, the plurality of biosensors, or the plurality of stimulus molecules, wherein the production of the output molecule or the alteration of the output property is based on a value associated with an information source, detecting an output received from one or more of the plurality of regions corresponding to the output molecule or the output property in that region and generating an electric signal associated therewith, and processing the electrical signal to determine the value associated with the information source.

In another aspect, a system includes a biosensor subsystem comprising a biosensor subsystem comprising a plurality of biosensors, a biotransmitter subsystem configured to produce an output molecule or alter an output property in response to the plurality of biosensors interacting with a plurality of stimulus molecules, the output property being associated with the output molecule, the plurality of biosensors, or the plurality of stimulus molecules, and an electronic receiver subsystem comprising an output detector, a processor, and a memory including instructions executable by the processor stored thereon, wherein the instructions upon execution by the processor, configure the processor to receive information from the output detector representative of sensing information conveyed by the biotransmitter subsystem, and process the information in digital form to detect one or more of the following the output property associated with the output molecule, a concentration associated with the output molecule, the output property associated with the plurality of biosensors, the output property associated with the plurality of stimulus molecules, a concentration of the plurality of biosensors, and a concentration of the plurality of stimulus molecules.

In yet another aspect, a system includes a microfluidic device comprising a plurality of regions, wherein each region comprises a plurality of biosensors, wherein the plurality of biosensors in each region is associated with at least one distinct threshold for an optically-triggered production of light-emitting molecules, and wherein the production of the light-emitting molecules is based on a value associated with an information source and triggered by at least one light beam incident on one or more of the plurality of regions, a light detector configured to detect light received from one or more of the plurality of regions corresponding to a light intensity of the light-emitting molecules in that region and generate an electrical signal associated therewith, and a processor configured to process the electric signal and determine the value associated with the information source.

In yet another aspect, the output molecule comprises a light-emitting molecule.

In yet another aspect, processing the received information in digital form comprises performing a demodulation operation on an electrical signal corresponding to the intensity of the light produced by the light-emitting molecules.

In yet another aspect, the biosensor subsystem further comprises an optogenetic system configured to produce the plurality of biosensors upon being optically triggered by a light beam with a predetermined wavelength.

In yet another aspect, the plurality of biosensors comprises a chimeric transcriptional activator Gal4dbd.ER.VP16 (GEV), the plurality of stimulus molecules comprises beta-estradiol molecules, wherein the light-emitting molecules comprise green fluorescent protein (GFP) molecules, and wherein the optogenetic system comprises a ZCRY2/CIB1AD optogenetic system.

In yet another aspect, the biosensor and biotransmitter subsystems are implemented using a microfluidic device comprising a plurality of regions, wherein each region produces a different granularity of biosensing detection in response to an incident light.

In yet another aspect, the plurality of regions is configured with different types of biosensors and different types of stimulus molecules.

In yet another aspect, the output property comprises a pH level, an electrical impedance, a level of molecular interaction between at least two of the output molecule, the plurality of biosensors, and the plurality of stimulus molecules.

In yet another aspect, each region comprises a plurality of stimulus molecules and an optogenetic system, and wherein the light intensity of the light-emitting molecules is based on a ratio of the plurality of biosensors and the plurality of stimulus molecules.

In yet another aspect, a wavelength or an intensity of the incident light is configured based on the information source.

In yet another aspect, a population density of the plurality of biosensors and the plurality of stimulus molecules are configured based on the information source.

In yet another aspect, a type of the plurality of biosensors and a type of the plurality of stimulus molecules are configured based on the information source.

In yet another aspect, the light detector comprises one or more of a cellphone, a plate reader, or a microscope.

BRIEF DESCRIPTION OF THE DRAWINGS

Many aspects of the present disclosure can be better understood with reference to the following figures. The components in the figures are not necessarily to scale. Instead, emphasis is placed on illustrating clearly the principles of the present disclosure.

DETAILED DESCRIPTION

Embodiments of the present technology, among other features and benefits, utilize an information source to configure one or more parameters of a bio-electronic communication system, wherein the biological sensors (e.g., biosensors) receive and convey information to an electronics framework that can read and process the information being transmitted through the biological sensors. Embodiments of the present technology can be used in many fields including, but not limited to, wearables, groundwater testing/sensing for compounds such as estrogen, fertility sensing, food safety and food industry testing, bioprocessing, and soil sensing. For instance, embodiments of the present technology advantageously enable communication in a hybrid bio-electronic framework which utilizes biological components for sensing but offloads processing and computation to traditional electronic systems and communication infrastructure. Specific details of several embodiments of the technology are described below with reference to FIGS. 1-7B.

Molecules and combinations of molecules are the natural communication currency of microbes; microbes have evolved and been engineered to sense a variety of compounds, often with exquisite sensitivity. The availability of microbial biosensors, combined with the ability to genetically engineer biological circuits to process information, make microbes attractive bionanomachines for propagating information through molecular communication (MC) networks. However, MC networks built entirely of biological components suffer a number of limitations. They are super-slow due to processing and propagation delays and must employ ultra-simple algorithms due to the still limited computational capabilities of biological circuits. Currently synthetically engineered biosensors are operated as independent units whose outputs are processed off-line (e.g., laboratory blood tests). This approach requires human involvement for post-processing, which is time-consuming, expensive, and prone to errors.

Accordingly, disclosed herein is a hybrid bio-electronic framework which utilizes biological components for sensing but offloads processing and computation to traditional electronic systems and communication infrastructure. The disclosed technology forms a bridge between synthetic biology and communication. This is achieved by using tools from the burgeoning field of optogenetics to trigger biosensing through an optoelectronic interface, alleviating the need for computation and communication in the biological domain.

Figure 2:
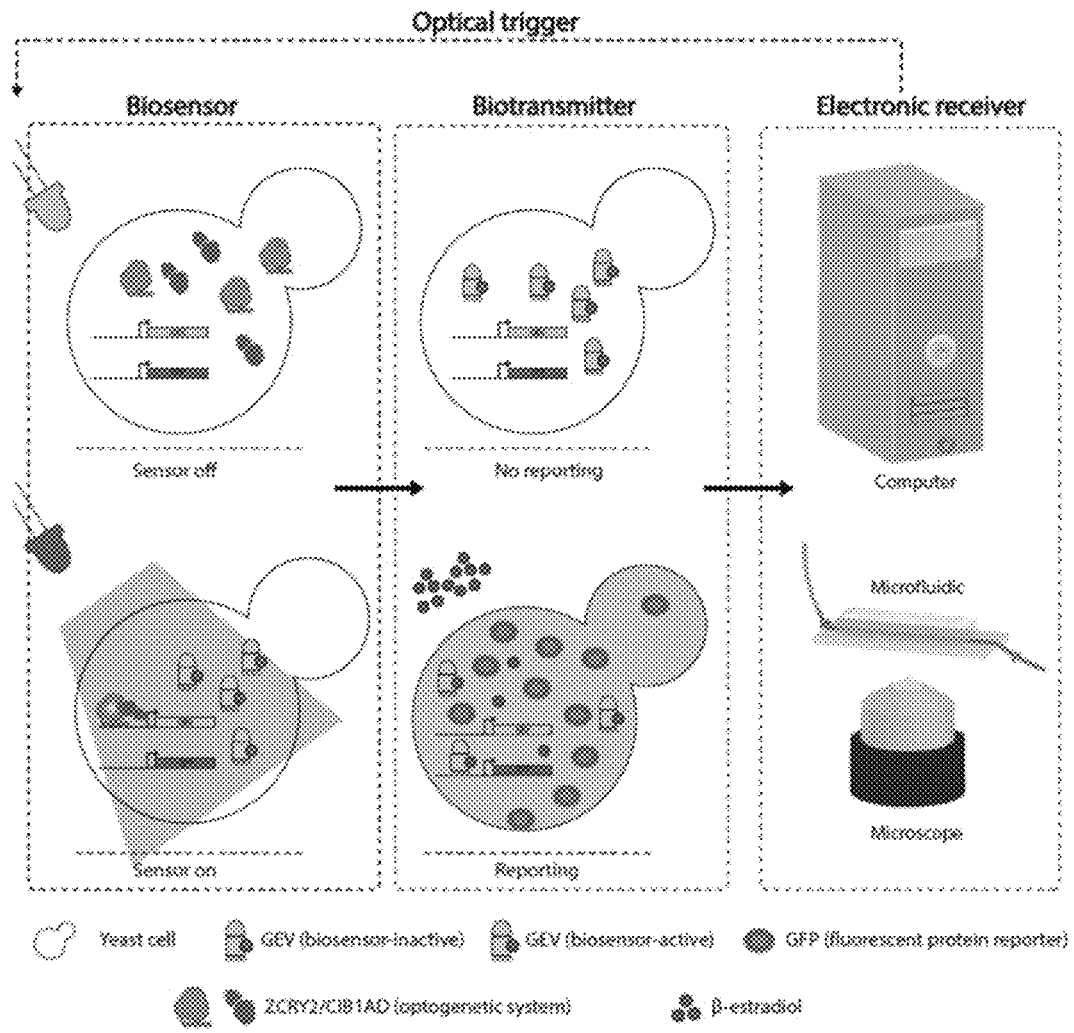
FIG. 2 illustrates an example of an optogenetic molecular communication scheme in accordance with embodiments of the present technology.

The framework consists of an external controller/trigger, a biosensor, and an electronic receiver as illustrated in FIG. 2. Specifically, an optical controller that uses light stimulus is employed to turn on (or off) a light sensitive protein which in turn initiates sensing. This requires the light stimulus to change the activity of a sensor protein either by directly modifying it or by changing its expression or localization within the cell. The network offloads computation and communication complexity to the receiver, which has access to electrical and electronic circuitry for processing.

The disclosed technology provides a practical way to implement biological sensing and retrieve data. This framework allows for integration of engineered or natural biological sensors to interact with the electronic world with the help of optogenetics. Instead of the challenges of engineering the organisms and cells with the desired controls, the electrical domain presents much easier and faster methods for controls.

Some applications of the disclosed technology include: wearables, groundwater testing/sensing for compounds such as estrogen, fertility sensing, food safety and food industry testing, bioprocessing, and soil sensing, with or without aid of microfluidic devices.

Cells have innate sensing capabilities and can sense important biological compounds, particularly compounds relevant for disease diagnosis and environmental monitoring. As such, cells are useful sensing components to interface MC networks with the natural world. However, attempting to engineer all aspects of an MC network with cells or cellular components comes with particular challenges. While cells and organisms are amazing biological computers in their natural milieu, the capabilities of engineered biological circuits are still more limited despite much progress in the field of synthetic biology. To circumvent this challenge, embodiments of the present technology describe bio-electronic networks having a framework that combines the innate sensing capabilities of biological compounds with the power of electrical and electronic systems. More specifically, embodiments of the present technology include bio-electronic networks with biosensors controlled by an external light stimulus.

In one example, optogenetic tools are used to engineer light-control of the desired sensor. Optogenetic tools were first developed for control of ion-flux in neuroscience and involve light-sensitive transmembrane ion-channel proteins called opsins, primarily from microbes, to control neural activity by changing the action potential across the cell membrane. Non-neural optogenetics, which is generally not focused on controlling ion flux, primarily uses nonopsin photoactivatable proteins or gene switches to develop light-sensitive tools to control cellular processes such as gene expression and signaling. Optogenetic tools have been shown to be effective in controlling a variety of cellular processes, from gene regulation to protein localization, in microbes such as *Escherichia coli* and *Saccharomyces cerevisiae*.

The light stimulus acts as an external controller that turns the biosensor on or off. The ability to light-gate sensing reduces the burden on the bio-transmitter to implement complex communication algorithms. The bio-electronic framework of the present technology therefore takes advantage of the strength of biological sensors while offloading the processing and computation to electronic systems and EM networks.

While the present technology is capable of being embodied in various forms, the description below of several embodiments is made with the understanding that the present disclosure is to be considered as an exemplification of the technology and is not intended to limit the technology to the specific embodiments illustrated. Headings are provided for convenience only and are not to be construed to limit the technology in any manner. Embodiments illustrated under any heading may be combined with embodiments illustrated under any other heading.

In the present description, any concentration range, percentage range, ratio range, or integer range is to be understood to include the value of any integer within the recited range and, when appropriate, fractions thereof (such as one tenth and one-hundredth of an integer), unless otherwise indicated. Also, any number range recited herein is to be understood to include any integer within the recited range, unless otherwise indicated. As used herein, the term "about" means±20% of the indicated range, value, or structure, unless otherwise indicated. It should b e understood that the terms "a" and "an" as used herein refer to "one or more" of the enumerated regions. Words using the singular or plural number also include the plural or singular number, respectively. Use of the word "or" in reference to a list of two or more items covers all of the following interpretations of the word: any of the items in the list, all of the items in the list, and any combination of the items in the list. Furthermore, the phrase "at least one of A, B, and C, etc." is intended in the sense that one having skill in the art would understand the convention (e.g., "a system having at least one of A, B, and C" would include, but not be limited to, systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense that one having skill in the art would understand the convention (e.g., "a system having at least one of A, B, or C" would include, but not be limited to, systems that have A alone, B alone, C alone, A and B together, A and C together, B and C together, and/or A, B, and C together, etc.). As used herein, the terms "include," "have," and "comprise" are used synonymously, which terms and variants thereof are intended to be construed as non-limiting. Further, headings provided herein are for convenience only and do not interpret the scope or meaning of the claimed embodiments.

The present technology has been described in terms of particular embodiments found or proposed by the present inventor to comprise preferred modes for the practice of the technology. It will be appreciated by those of skill in the art that, in light of the present disclosure, numerous modifications and changes can be made in the particular embodiments exemplified without departing from the intended scope of the technology. For example, due to codon redundancy, changes can be made in an underlying DNA sequence without affecting the protein sequence. Moreover, due to biological functional equivalency considerations, changes can be made in protein structure without affecting the biological action in kind or amount. All such modifications are intended to be included within the scope of the present technology.

Unless otherwise defined, all technical and scientific terms used herein have the same meaning as commonly understood by one of ordinary skill in the art to which this disclosure pertains. Although methods and materials similar or equivalent to those described herein can b e used in the practice of the present disclosure, suitable methods and materials are described below. Unless otherwise indicated, nucleic acids are written left to right in 5' to 3' orientation; amino acid sequences are written left to right in amino to carboxy orientation, respectively. All publications, patent applications, patents, and other references mentioned herein are expressly incorporated by reference in their entirety. In cases of conflict, the present specification, including definitions, will control. In addition, the materials, methods, and examples described herein are illustrative only and are not intended to be limiting.

Example Components of a Molecular Communication System

Communication between sensors, and to the external world is essential to build an autonomous network; it enables the sensors to convey information in real-time. Existing research on MC systems identifies three building blocks, in line with digital communication systems, e.g., a transmitter, a receiver, and a channel. The transmitter includes a sensor, a processing unit with or without storage, a modulator, followed by the channel that allows information to b e carried through it to a receiver that includes a demodulator, decoder, and processor.

Figure 1:
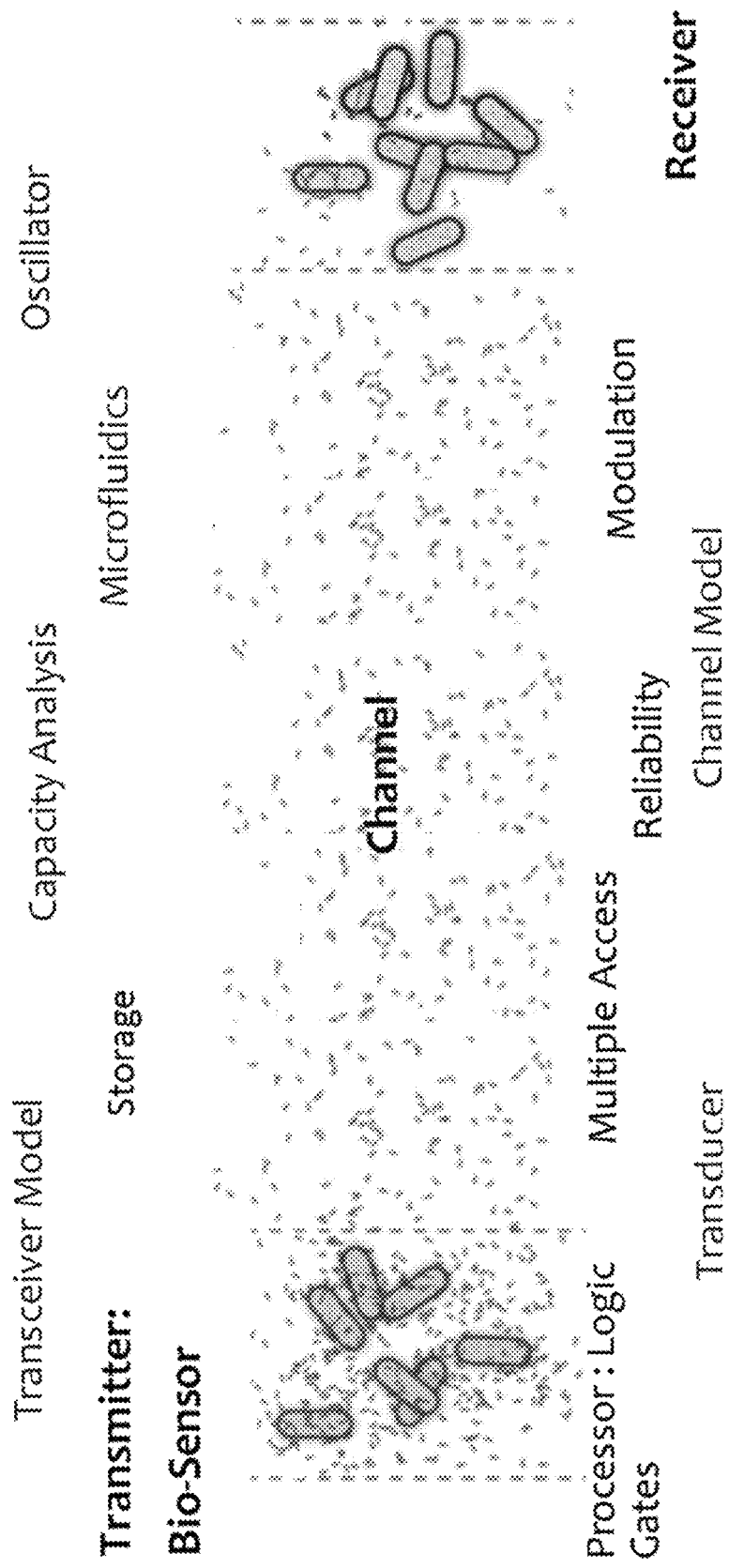
FIG. 1 illustrates an overview of an example molecular communication system in accordance with embodiments of the present technology.

FIG. 1 illustrates the broad categories of MC research. As shown therein, the building blocks of an MC system include:

Biosensor. Biological sensors, such as biosensors, can reach and in turn provide access to domains that are typically inaccessible to the conventional electromagnetic world. In an MC network, the transmitter, which is typically co-located with the sensor, is event-triggered, e.g., it initiates communication when the sensed signal is above a threshold. Therefore, the sensor remains "on" all the time. An always-on biological sensor must incorporate mechanisms to maintain the properties of the sensor. In some embodiments, a biosensor is a cell, such as a whole-cell biosensor. In other embodiments, a biosensor is a protein, a nucleic acid (e.g., DNA and/or RNA), or a combination thereof. In these embodiments, the biosensor can be multiplexed. For example, the protein biosensor, the nucleic acid (e.g., DNA and/or RNA) biosensor, or the multiplexed biosensor can be localized within a cell, such as a single cell. For whole-cell biosensors, this includes the need for mechanisms to maintain cell viability while controlling population size, which in turn require the hardware such as a microfluidic chip to b e capable of adapting to these dynamic changes.

Processing unit. A sensor is followed by, or includes, a processing unit, with optional storage units, that maps sensed signal to information units, and a modulator to embed information to chemical signals. Although the feasibility of constructing biological gates and memory has been investigated in existing systems, realizing complex biological circuits in practice requires significant advancements in synthetic biology.

Channel. A variety of channel models have been proposed and validated for MC channels. MC channels can be broadly classified into diffusion-based, flow-based, and active transport-based paths. Research on microfluidic chips/arrays to house and carry information molecules have resulted in a range of channel geometries and architecture. In case of a living biosensor, the channel must also allow nutrients to pass through, but not the transceivers themselves. In an example of flow-based propagation, channel geometry and length also determine the maximum propagation speed, in turn limiting the distance.

Receiver. The information conveyed by the biosensors and the chemical signals is received, through the channel, and processed by a receiver that includes, in an example, a demodulator (e.g., a counterpart to the modulator described in the processing unit), decoder, and processor. In an example, the receiver is coupled to a microfluidic chip/array and includes sensing devices that can be configured to extract the information carried in the chemical signals and the biosensors. In another example, the receiver can be coupled to a different channel architecture, e.g., the biosensors in a microwell plate.

Example Algorithms for a Molecular Communication System

While MC has similarities to other communication systems in the architecture and communication paradigms, it differs significantly in channel conditions, channel geometry, complexity, stability, availability, and feasibility of system hardware. Most importantly, MC utilizes chemical molecules as carrier signals to communicate. These differences have driven the need for algorithms and protocols for molecular communication.

Physical Layer. A practical deployment of a communication link requires transmission of data from one end to the other. Physical layer algorithms in MC include modulation schemes to encode information, encoders and decoders, and models for simulating the behavior of biological transceivers. However, the majority of the transceiver models and the algorithms are specific to an experimental setup and are difficult to generalize and recreate.

Link Layer. When more than one transmitter communicates to the receiver and/or multiple senders communicate to multiple receivers, the need for addressing and medium access control (MAC) arises. In an example, MAC algorithms are designed based on the type of signal, spatial diversity, and/or characteristics of the signal.

Network Layer. An increase in the distance between the sender and the receiver in traditional communication systems result in multiple hops between transceivers, in need of routing algorithms, which are implemented as part of the network layer.

Example Embodiments of Bio-Electronic Networks

Embodiments of the present technology integrate the strength of biosensors with the power of electronics and optogenetics. In some embodiments, a bio-electronic network includes a biosensor, biological transmitter, an electronic receiver, and an opto-electronic stimulus/trigger as illustrated in FIG. 2.

Biosensors are the driving force to the inception of biological communication networks. Sensors give networks access to new domains, and communication allows this information to be relayed. Bio-electronic network retains the benefits of a biosensor, without overwhelming the biological circuitry with computation and communication needs. A bio-electronic network eliminates the need for synthetically engineered biological computation circuits by using an external trigger that drives the biosensor.

In some embodiments, an optical stimulus can be used for a light sensitive biosensor. For example, in its default operation, the sensor remains in sleep or idle mode, and is woken up by an external light trigger which guides the sensor to sense. On trigger, the sensed information is encoded, modulated, and transmitted, which is then received by an electronic receiver. A bio-electronic network therefore offloads computational and communication complexity to electronic circuitry while biological circuitry is dedicated for sensing.

The ability to turn a biosensor on or off at specific times or in specific populations of cells would alleviate some of the challenges of a purely biological MC network. Some embodiments can be configured to use a variety of stimuli, e.g., pH, temperature, and chemical inducers, which can be used to control biological processes and turn a biosensor on or off. Such control could happen either directly, through activation or inhibition of the sensor, or indirectly through control of gene expression or protein circuits capable of regulating the sensor.

In some embodiments, light can be used as stimuli because it can be precisely controlled in space and time, with tunable wavelength and intensity. Compared to chemical inducers, light is inexpensive and can be controlled with readily available electronic and optical components. The control of cellular processes with genetically encoded light-sensitive proteins is often referred to as 'optogenetics'. Light-sensitive proteins have evolved naturally in many organisms, such as plants and light-dependent microbes, to sense and respond to light. These naturally occurring proteins have different sensitivities to both the wavelength and intensity of light, with many proteins being sensitive to blue (such as but not limited to about 450 nm), red (such as but not limited to about 650 nm) and far-red (such as but not limited to about 750 nm) wavelengths. Optogenetics takes advantage of these naturally occurring light-sensitive proteins to actuate processes inside of a cell.

The embodiments described herein leverage optogenetic tools, which were first developed for control of ion-flux in neuroscience. Light-sensitive transmembrane ion-channel proteins called opsins, primarily from microbes, are used in neuroscience to control neural activity by changing the action potential across the cell membrane. Non-neural optogenetics, which is generally not focused on controlling ion flux, primarily uses nonopsin photoactivatable proteins or gene switches to develop light-sensitive tools to control cellular processes such as gene expression and signaling. Optogenetic tools have been shown to be effective in controlling a variety of cellular processes, ranging from gene regulation to protein localization, in microbes, plants, and mammalian cells. Non-limiting examples of microbes include Escherichia coli and Saccharomyces cerevisiae. Optogenetic tools useful with the present technology can further comprise cell-based biosensors, such as microbe biosensors, plant biosensors, and mammalian cell-based biosensors.

Embodiments of the present technology utilize optogenetic tools to modulate the response of biosensors, such as to turn specific biosensors on (or off). This requires the light stimulus to change the activity of the biosensor either by directly modifying it or by changing its expression or localization within the cell. In some embodiments, the biosensor is a protein, such as a sensor protein. In other embodiments, the biosensor is a nucleic acid (e.g., DNA and/or RNA) or a small molecule, such as a nucleic acid (e.g., DNA and/or RNA) sensor or a small molecule sensor. In still further embodiments, the biosensor is a combination of a protein, a nucleic acid (e.g., DNA and/or RNA), and/or a small molecule. There are several routes to implementing optogenetic control of a biosensor. In an example, optogenetic tools that have been developed to drive gene expression are used to change the expression level of a biosensor protein. In another example, tools that control molecular targeting signals within a cell are used to change the localization of a biosensor protein. Since a biosensor's location in the cell (e.g. at the plasma membrane) often determines its activity, this light-based targeting also serves to control the activity. In yet another example, light-induced clustering of biosensors is used to control their activity. In yet another example, more advanced protein engineering techniques can be used to control the activity of a biosensor itself by incorporating a light sensitive protein into the structure of the biosensor protein. In still another example, optogenetic approaches for targeting specific proteins for degradation are used to reduce the level of a biosensor, only allowing sensing under illumination conditions that allow biosensor expression levels to recover.

In some embodiments, optogenetics is integrated into MC networks by configuring an optical trigger to access cells to modify their sensing properties. These cells are then configured to sense a signal and transmit it to a receiver. The receiver is further configured to coordinate the optical trigger to determine the sensing properties desired at a given moment based on the underlying communication algorithm.

An example optogenetic molecular communication scheme can be further understood based on the illustrations provided in FIG. 2. As shown in the top row, in the absence of illumination, the biosensor is off, and thus no information is transmitted by the biotransmitter and none is received by the electronic receiver subsystem. When the light is turned on (bottom row in FIG. 2), the biosensor is turned on, and the information is conveyed by the biotransmitter to the electronic receiver. In the example shown in FIG. 2, yeast is used as a sensing organism. Specifically, Saccharomyces cerevisiae are an excellent sensing organism as they have been engineered to sense a wide variety of compounds. They are a standard chassis organism in synthetic biology amenable to further engineering, which are generally non-pathogenic, and can survive a variety of environments, including in vivo niches in the human body and harsh environmental conditions.

Sensor: One of the most prolific classes of yeast biosensors are based on heterologous expression of human steroid receptors. The human estrogen receptor (hER) has been known to function in yeast since 1988 and further efforts have developed additional human receptors into yeast biosensors of human hormones and hormone disruptors. These sensors have been applied to test compounds or environmental samples for endocrine disruptive compounds (EDCs) that pose a significant risk to human health.

Optical stimulus and biotransmitter: The ZCRY2/CIB1AD optogenetic system, the GEV sensor, and use of the human estrogen receptor (hER) in yeast, have been described previously. Briefly, and without intending to be limiting, the ZCRY2/CIB1AD optogenetic system is one of a plurality of optogenetic systems that has been modified to be useful with the present technology. Using the modified ZCRY2/CIB1AD system, yeast is an estrogen sensor and the capabilities of yeast to sense estrogen is controlled by exposure to blue light. In an example, this is achieved by putting protein expression of a yeast biosensor for estrogen, for example the GEV sensor, under the control of the ZCRY2/CIB1AD optogenetic system. In this optogenetic system, dimerization of a split transcription factor (ZCRY2/CIB1AD) is controlled by blue light (through CRY2/CIB1 binding) and genes put under the control of a responsive promoter (e.g. pZF-GEV) are expressed in response to blue light. In this way, yeast is capable of sensing estrogen after exposure to blue light.

In an example, when GEV is expressed, it is sequestered in the cytoplasm of the yeast cell by a chaperone complex (Hsp90). Estrogen is sensed by displacing Hsp90, allowing GEV to localize to the nucleus of the yeast cells, where it binds a GEV-responsive promoter to drive expression of a fluorescent protein. Thus, estrogen levels are converted to a fluorescent signal. In this regard, yeast carrying the GEV biosensor under the control of the ZCRY2/CIB1AD optogenetic system is cultured in a bioreactor that is illuminated by a blue (450 nm) LED. Estrogen or EDCs present in the media are sensed by the yeast cells in culture when the GEV biosensor is present.

Receiver/readout mechanism: Continuing with the example above, the corresponding fluorescence signal can be read out by several methods, including by automatically sampling yeast into a microfluidic device and using fluorescence microscopy. In the example illustrated in FIG. 2, a biosensor is triggered using blue light and read-out is effectuated using fluorescence to implement a bio-electronic network.

Figure 3A:
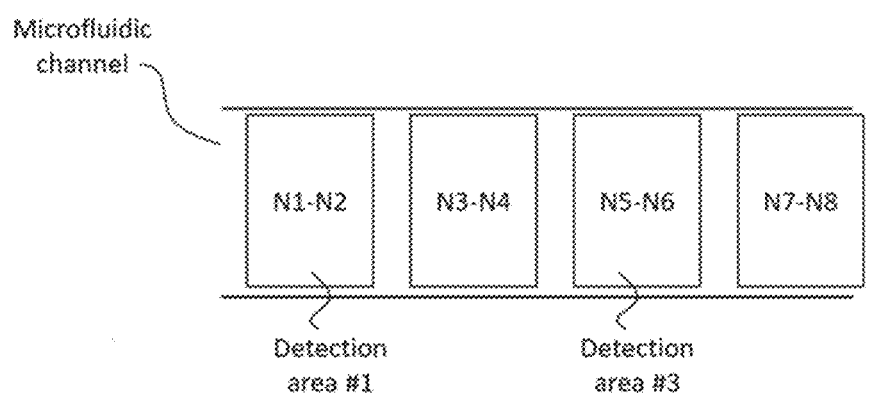
FIGS. 3A and 3B are block diagrams illustrating examples of microfluidic channels that can be used for biological sensing and communication using optogenetics and electronics in accordance with embodiments of the present technology.

In some embodiments, as illustrated in FIG. 3A, a microfluidic channel comprises a plurality of regions, each of which includes a distinctly configured optogenetic system, biosensor, and/or stimulus molecule. In the example illustrated in FIG. 3A, the light-emitting molecules are produced in a first region of the microfluidic channel when the light beam (also referred to as a stimulus or trigger, and distinct from the stimulus molecules that react with the biosensors) is incident on that region and the concentration of biosensors (or stimulus molecules) is between N1 and N2. Similarly, light-emitting molecules are produced in a second region when the concentration of biosensors (or stimulus molecules) is between N3 and N4. In this example, the thresholds (N1, N2, N3, . . . ) are configured to be non-overlapping. In operation, each detection area of the microfluidic system of FIG. 3A, upon illumination by light in the desired range of wavelengths, is configured to provide a different level of fluorescence (including none), thus providing detection sensitivity information with different levels of granularity.

Figure 3B:
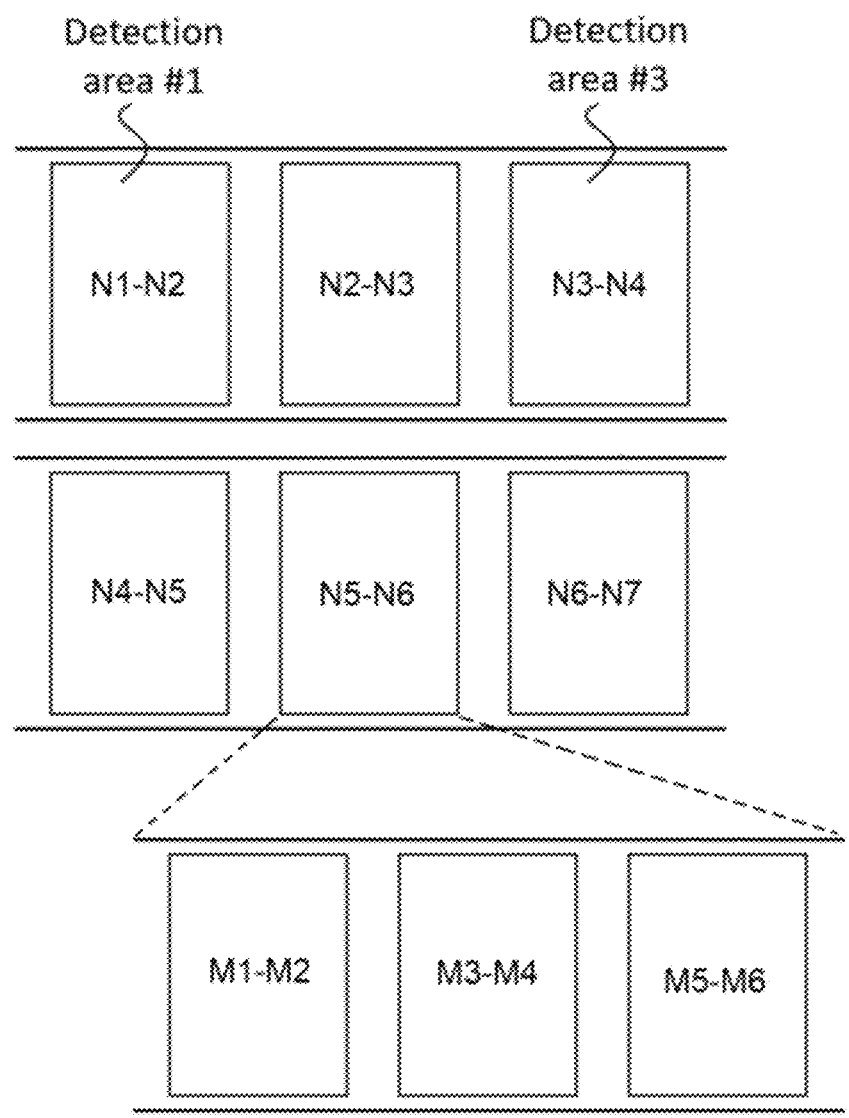

FIG. 3B illustrates an example of a microfluidic channel that is configured to cover an expanded detection range. As shown therein, the regions are configured to detect overlapping thresholds, e.g., N1-N2, N2-N3, N3-N4, . . . . Furthermore, the range N5-N6 can be further expanded into a separate microfluidic channel with non-overlapping ranges M1-M2, M3-M4 and M5-M6, wherein N5≤M1 and N6≥M6. This example illustrates that both overlapping and non-overlapping detection regions can be concurrently used in a microfluidic channel. Another example that provides both coarse and fine detection capabilities is illustrated in FIG. 7B.

In some embodiments, the production of the light-emitting molecules in each of the regions illustrated in FIGS. 3A and 3B is based on an optogenetic system producing biosensors (e.g., GEV in FIG. 2) that can react with stimulus molecules (e.g., beta-estradiol in FIG. 2). In an example, the production of the biosensors by the optogenetic system can be triggered by illumination by light in the desired wavelengths.

The ability to distinctly configure each of the plurality of regions advantageously enables information to be conveyed through the biological interactions between the biosensors, stimulus, and light-emitting molecules. In an example, population density of the light-emitting molecules can be varied in each of the plurality of regions to provide sensing at different levels of granularity. In another example, the wavelength of the light beam that is incident on each of the plurality of regions can be varied to produce wavelength-dependent sensitivity information. In yet another example, the specific biosensors and stimulus molecules in each of the plurality of regions can be varied to convey information from the information source.

More generally, the examples illustrated in FIGS. 3A and 3B comprise multiple regions each of which include an optogenetic system that can be optically triggered to produce a biosensor, which can interact with a stimulus molecule to either produce an output molecule and/or alter an output property of one or more of the biosensor, the stimulus molecule and the output molecule. In one of the examples described above, the output molecule is the light-emitting molecule, and in another example, the output property is the population density of the light-emitting molecules. In the described embodiments, the production of the output molecule and/or the alteration of the output property can be modulated based on the information source.

These variations can be encoded in the biological framework based on an information source (e.g., a bitstream source that generates "0" and "1" values), and the electronic framework can then be used to extract this information for further processing. This approach leverages the complexity of the biological systems to encode and carry information and uses the electronic framework to shoulder the computational and communication complexity of the system.

The bio-electronic networks comprised in some of the described embodiments are characterized by at least the following features and benefits.

Addressing and Medium Access Control. A bio-electronic network simplifies addressing and MAC by outsourcing it to the external trigger. The optical trigger specifically turns on and off the biosensor and hence does not require additional addressing. In an example, a group of biosensors may be deployed spatially. In this example, the optical trigger is directed to one sensor at a time and hence the sensor does not have to convey an address with the information to identify the specific biosensor that produced the information. The external trigger can thus implement other MAC protocols without requiring any coordination between the senders. The external control therefore simplifies the system design, as well as the communication algorithm design.

Routing and reliability. In a bio-electronic network, routing is performed on the receiver end to steer the trigger to the corresponding sensor. The sensor is thus unaware of the network and eliminates overheads to determine the best route. Reliability mechanisms, similarly, can be offloaded to the electronic domain, greatly simplifying the bioengineering requirements. The receiver, aware of the sensor that is triggered is responsible for resolving data from the sensor. Feedback requirements of traditional reliability protocols are replaced by follow up stimulus from the external controller.

Distributed sensing. The light control further allows parallel sensing without additional overheads. In an example, multiple EDCs can be sensed. Yeast biosensors for a variety of human EDCs have been developed. A mixed culture of yeast cells, each containing a specific biosensor is grown in a bioreactor. By serially deciding which sensor should be on (e.g., using different colored LEDs as stimuli), the output for each sensor (e.g., fluorescence) can be the same. Light can also be exquisitely controlled in space. If individual sensors are spatially separated, this would allow all of the yeast colonies to report their information using the same signal and channel, as the receiver could deconvolve this by knowing which biosensors had been turned on.

A bio-electronic network, as described in the embodiments herein, offloads computation and communication to the receiver/controller and the biosensor is only responsible for sensing and encoding information. This framework advantageously enables the development of communication techniques to enhance the throughput and delay performance, diversifying the sensors and environments, improving the scale of the network, and simplifying hardware for practical deployments. For example, the following communication algorithms and techniques can developed for bio-electronic network based on the embodiments described herein.

Modulation. In some embodiments, modulation techniques developed for MC are used to encode information in response to a light trigger. In an example, the set of parameters that are used to modulate the data include properties of the colony, characteristics of the output signal, and optical properties of the colony, among others.

In some embodiments, a biosensor transitioning between the dormant state (no fluorescence) and the active state (fluorescence) can be used as a modulation scheme. In other embodiments, an intensity of the fluorescence can be used to modulate information. In yet other embodiments, a level of growth of the population (or population density) can be used as a modulation scheme. For an example, the population density corresponds to the density of cells or biosensors (with each biosensor being a cell). For another example, it corresponds to the plurality of biosensors within a single cell.

Scalability. In some embodiments, data can be collected from a large number of sensors without any coordination on the transmitter end. Herein, the receiver can be configured to coordinate the trigger and resolving the responses (e.g., as shown in FIGS. 3A and 3B, wherein the resolution of detection can be configured based on system requirements and parameters). In an example, queuing theory, cooperative communication, and parallel processing can be adapted to maximize the scale and hence the throughput. In another example, optimizing the number of sensors that can be triggered and processed in parallel results in increasing the throughput of the network.

Cross-talk and interference. In some embodiments, techniques from synthetic biology and optogenetics can be leveraged to enable biosensor activity to be controlled by a specific wavelength of light. However, difficulties start to arise when multiple sensors need to be controlled with different wavelengths because of the crosstalk between the light-responsive proteins used to construct optogenetic systems, in that they may respond to a range of light wavelengths. In an example, error correction mechanisms on the receiver side can be used to overcome these effects, which can significantly improve the reliability of a bio-electronic network. In another example, communication techniques to leverage spatial diversity and co-operative sensing that are aware of interference can be used to overcome this challenge.

In an example, the error correction mechanism can be implemented as a parity check code where one of the regions (e.g., detection area #1 in FIG. 3A) could be configured as a function of the other three regions. In another example, the error correction mechanism can b e implemented as a repetition code where multiple regions are configured to provide the same output (e.g., as illustrated in the context of FIG. 7B).

Optical network architecture. In some embodiments, the bio-electronic network can be configured to include an array of optical triggers interacting with a large set of biosensors. In an example, network architecture design can be used to optimize the number of optical trigger systems for a given array of sensors. In another example, compressed sensing and graph coloring techniques can be adapted to incorporate the latency due to switching and response time, which can result in a large-scale, practical bio-electronic network.

Example Applications of Bio-Electronic Networks

Embodiments of the present technology can be configured to operate in a variety of applications, which include, but are not limited to, the following.

Management of live cell biosensors. The external stimulus in a bioelectronic network lets the sensor remain in idle mode except while sensing. In order to allow sensors to rapidly "wake up" in response to a trigger, dormant and senescent cells must be avoided, which reduces the latency of the sensing system. In an example, a microfluidic chip can be configured to handle cell cultures and ensure constant colony size, which improves the usability of this framework. In another example, the biosensors can be further configured to return to sleep, which also improves the sensing system.

Spectrum expansion. Optogenetic tools leveraged by the embodiments described herein use light-sensitive proteins. There are currently a limited number of wavelengths to which these proteins respond, due to chromophore properties, which reduces the number of distinct wavelengths that can be combined independently. In an example, this limitation can be overcome using hybrid optogenetic circuitry that responds to the rate and intensity of light, in addition to the wavelength. Accordingly, multiple sensors may be utilized with the same color of light. This enables a limited number of light wavelengths to control a larger number of sensors.

Biological sensor stability. Bio-electronic networks simplify MC by reducing the engineering burden on the sensor. In some embodiments, stability of the biosensor can be improved. For example, the resource allocation in biosensors can be carefully accounted for to reduce the deleterious effect of heterologous protein expression. In another example, stem-cell like regenerative properties can be engineered into microbial communities to ensure biosensor stability.

Expanding biological readouts. Fluorescence is a well-received readout owing to its ease-of-use in laboratories. The embodiments described herein can be configured to expand the repertoire of readouts beyond fluorescence, which would allow the output of bio sensors to b e measured with more rapid, inexpensive, and miniaturizable technology. This would advantageously enable readouts for colony growth, luminescence, and production of hydrogen ions that can be measured using a pH electrode. For example, detections based on a change in an intensity or polarization of the received light can be used as a basis for sensing.

Harnessing microbial diversity. Currently, a limited number of chassis organisms that can be engineered are used for sensing. The embodiments described herein can leverage non-domesticated microbes that provide advantages over the commonly used organisms; they contain unique natural sensors and are adapted for a range of environments and environmental stressors.

Example Methods and Implementations of the Present Technology

Figure 4:
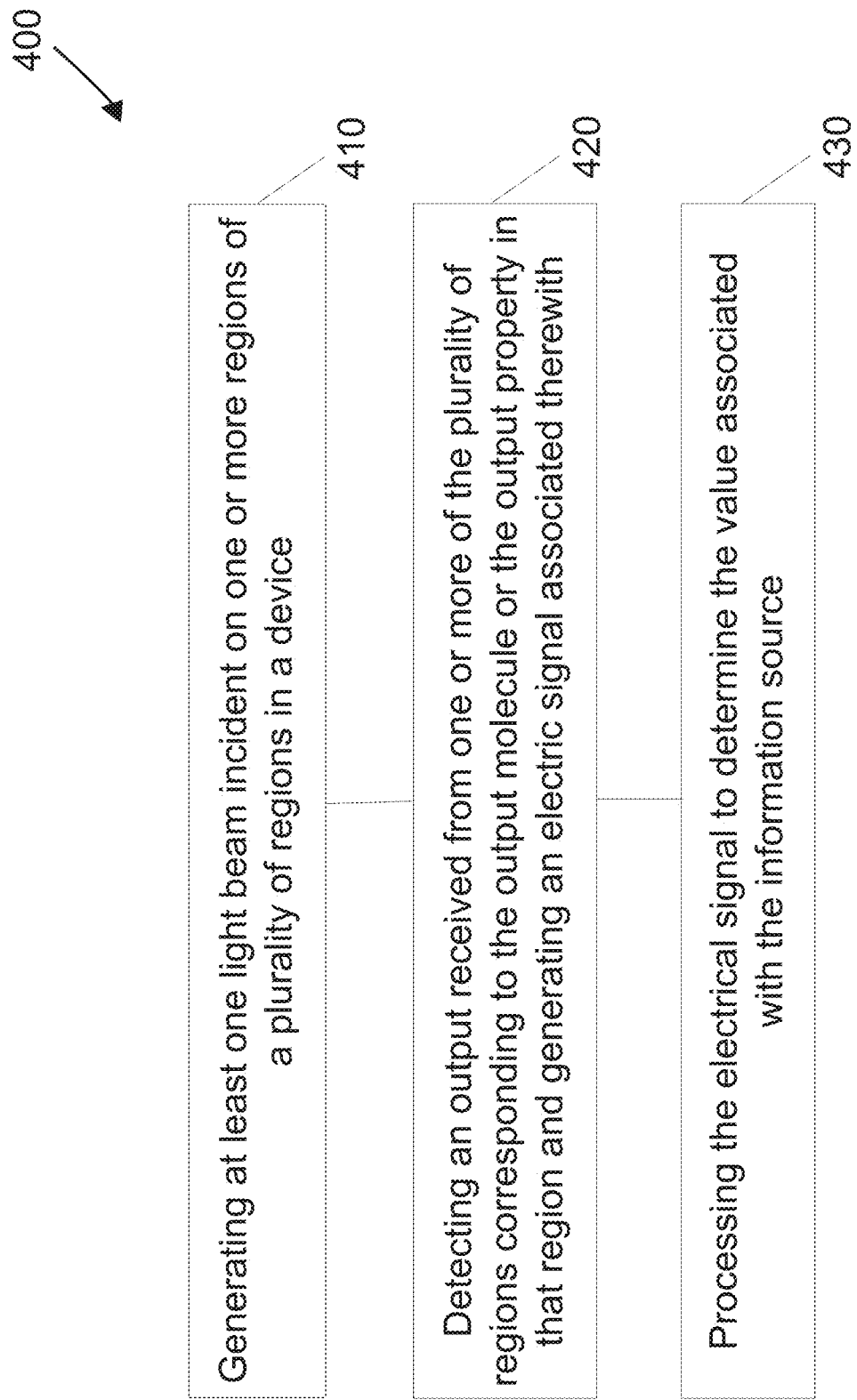
FIG. 4 illustrates a flowchart of a method for biological sensing and communication using optogenetics and electronics in accordance with embodiments of the present technology.

FIG. 4 illustrates a flowchart of an example method for biological sensing and communication using optogenetics and electronics. The method 400 includes, at operation 410, generating at least one light beam incident on one or more regions of a plurality of regions in a device. In this example method, each region comprises an optogenetic system to generate, upon interacting with the at least one light beam, a plurality of biosensors, an interaction between the plurality of biosensors and a plurality of stimulus molecules in each region is associated with at least one distinct threshold for a production of an output molecule or an alteration of an output property associated with the output molecule, the plurality of biosensors, or the plurality of stimulus molecules, and the production of the output molecule or the alteration of the output property is based on a value associated with an information source.

The method 400 includes, at operation 420, detecting an output received from one or more of the plurality of regions corresponding to the output molecule or the output property in that region and generating an electric signal associated therewith.

The method 400 includes, at operation 430, processing the electrical signal to determine the value associated with the information source.

In some embodiments, the distinct thresholds for one or more parameters of the system (e.g., in each of the regions illustrated in FIGS. 3A and 3B) can be configured in order to convey information from the information source to the light detector, via the light source. In an example, the population density (or growth rate) in each of the regions of the microfluidic channel can be configured to convey information. In another example, each of the regions are populated with different biosensors and stimulus molecules in order to convey information. In yet another example, the wavelength of the light beam that is incident on the one or more regions can be varied in order to convey information.

Figure 5:
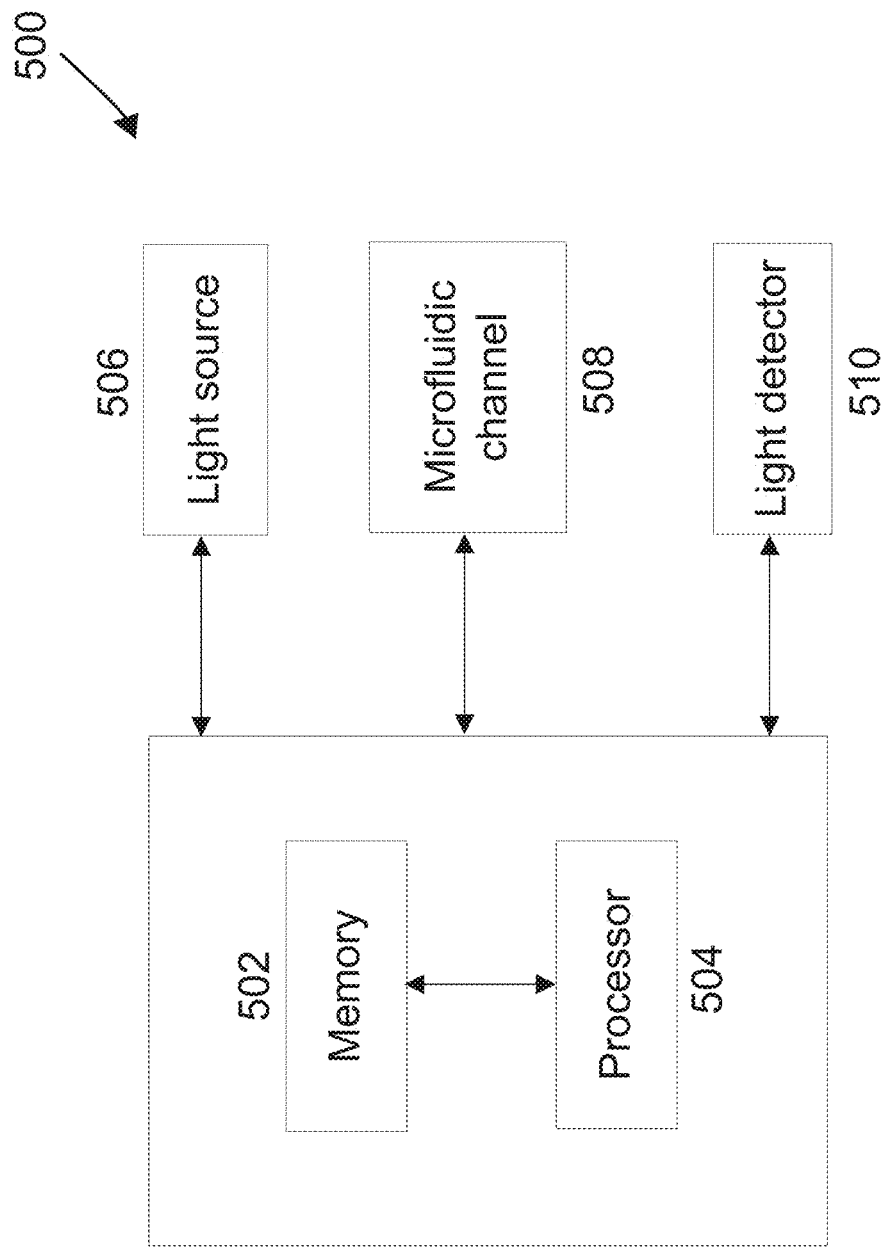
FIG. 5 is a block diagram representation of a portion of an apparatus in accordance with embodiments of the present technology.

FIG. 5 is a block diagram of an example hardware apparatus (which includes the illustrated electrical and processing hardware and optical hardware that is not shown in FIG. 5) that can accommodate at least some of the present technology. The apparatus 500 may include one or more processors 502, one or more memories 504, a light source 506, a microfluidic channel 508 (or more generally a microfluidic channel), and a light detector 510. The processor(s) 502 may be configured to implement one or more methods (including, but not limited to, method 400) described in the present document. The memory (memories) 504 may be used for storing data and code used for implementing the methods and techniques described herein. The light source 506, microfluidic channel 508, and light detector 510, are independently coupled to the processor 502 and/or the memory 504 and can receive commands and signals from the processor; the light source 506, microfluidic channel 508, and light detector 510 may also transmit signals including data and commands to the processor 502 and/or memory 504.

Implementations of the subject matter and the functional operations of the present technology can be implemented in various systems, digital electronic circuitry, or in computer software, firmware, or hardware, including the structures present in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g, code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instruction s and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

Figure 6:
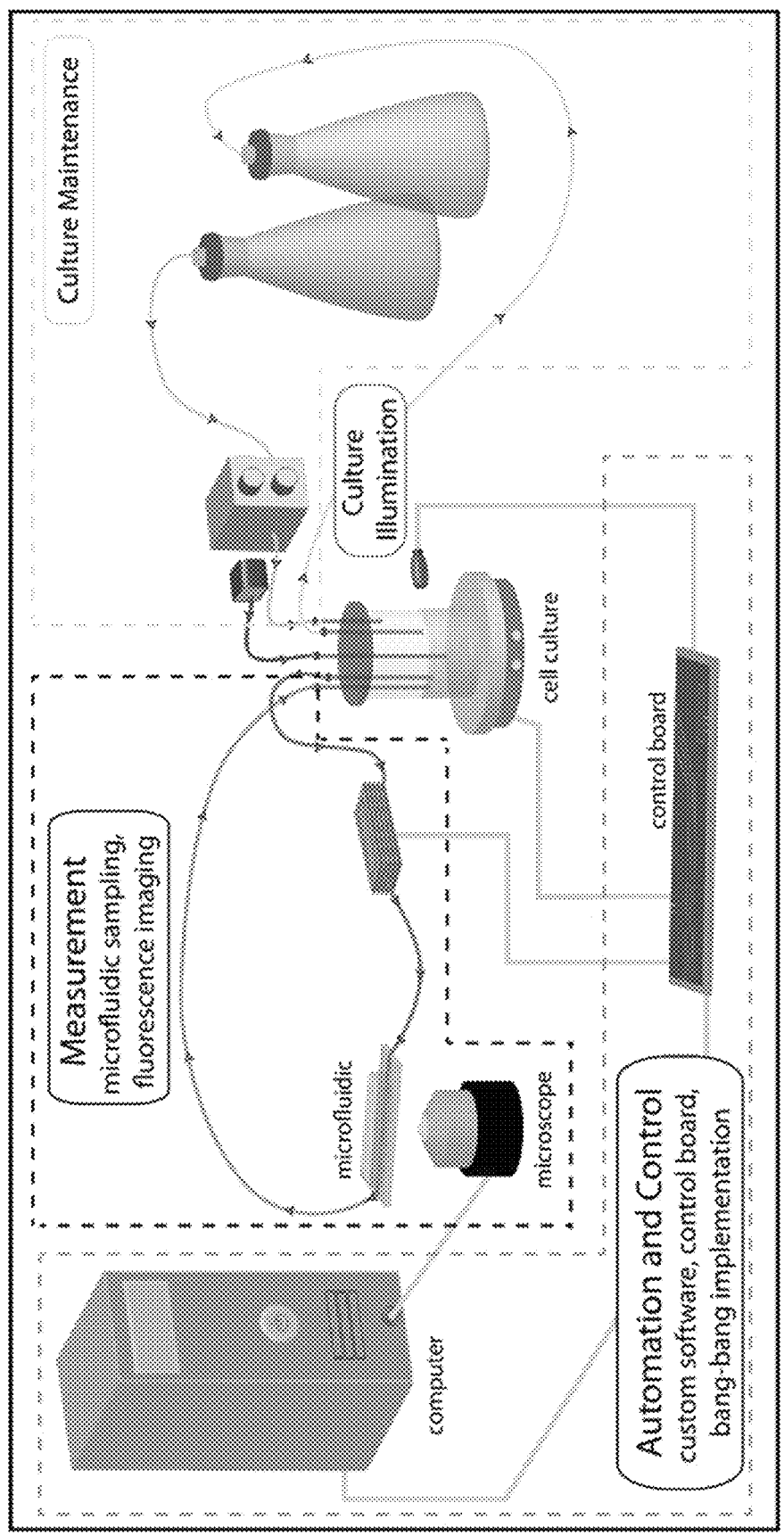
FIG. 6 illustrates an overview of a system for biological sensing and communication using optogenetics and electronics in accordance with embodiments of the present technology.

FIG. 6 is a system for biological sensing and communication using optogenetics and electronics that can accommodate at least some embodiments of the present technology. As shown, the system includes at least four portions, an automation and control portion, a measurement portion, a culture illumination portion, and a culture maintenance portion. Within each portion are elements, such as a computer element and a control board element of the automation and control portion, a microfluidic element and a microscope element of the measurement portion, a cell culture element of the culture illumination portion, and the like. As an example, the automation and control portion can, include apparatus 500 as illustrated in FIG. 5 and/or other apparatuses in accordance with the present technology. The culture illumination portion can, for example, include the optogenetic molecular communication scheme illustrated in FIG. 2 and/or other optogenetic molecular communication schemes in accordance with the present technology. As another example, the measurement portion can include automatically sampling yeast into a microfluidic device, such as the microfluidic devices illustrated in FIG. 3A and/or FIG. 3B, detected, and measured using fluorescence microscopy as shown in FIG. 2.

The elements described above within each portion of the system and shown in FIG. 6 are not intended to be limiting and each portion of the system can include at least the elements shown in FIG. 6 and described herein, additional elements not shown in FIG. 6 or described herein, or may lack at least one of the elements shown in FIG. 6 and described herein. For example, one or more portions of the system can further include additional elements, such as but not limited to, tubing, valves, switches, pumps, batteries, plugs, a light source, flasks, stoppers, knobs, plates, chambers, cells, media, and media additive factors.

The system illustrated in FIG. 6 can be configured to perform methods in accordance with the present technology, such as but not limited to, method 400 as illustrated in FIG. 4. As another example, without intending to limit the use and/or methods performed by and/or in each portion of the system, the automation and control portion of the system comprises software, that is, for example, configured to perform at least one step of the methods associated with embodiments of the present technology, and bang-bang implementation. As another example that is not intended to limit the use and/or methods performed by and/or in each portion of the system, the measurement portion is configured to perform microfluidic sampling and fluorescence imaging.

As yet another example that is not intended to limit the use and/or methods performed by and/or in each portion of the system, the culture illumination portion is configured to illuminate one or more cultures of cells of the system and the culture maintenance portion is configured to support proliferation and survival of the cells cultured in the system.

In other embodiments of the system for biological sensing and communication using optogenetics and electronics that can accommodate at least some of the present technology, each of the four portions illustrated in FIG. 6 can be combined with at least one other portion of the system or other portions of the system in accordance with the present technology. For example, the culture maintenance portion and the culture illumination portion can be combined into a culture portion resulting in a system with three portions instead of the illustrated four portions. Despite having fewer portions, the system with three portions can be, but is not necessarily, configured to perform the same methods as the system having four portions.

Figure 7A:
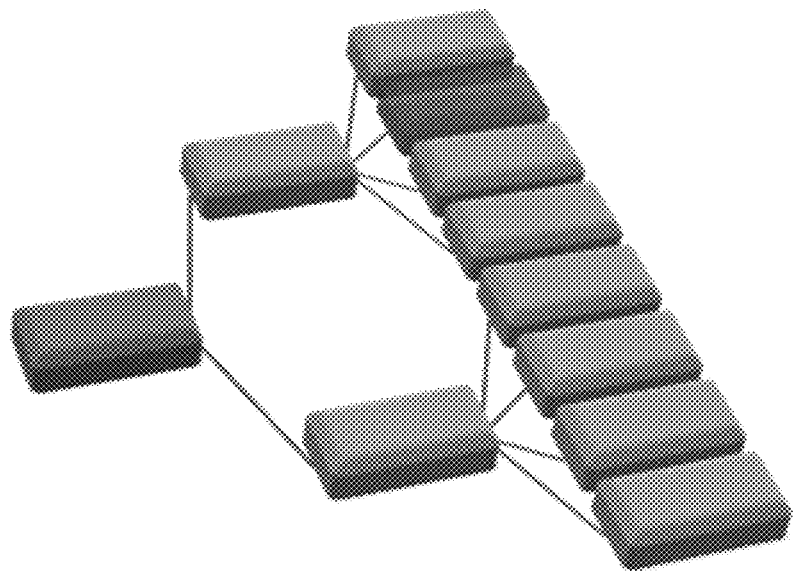
FIGS. 7A and 7B are block diagrams illustrating networks of optogenetic systems that enable network scale and throughput in accordance with embodiments of the present technology.
Figure 7B:
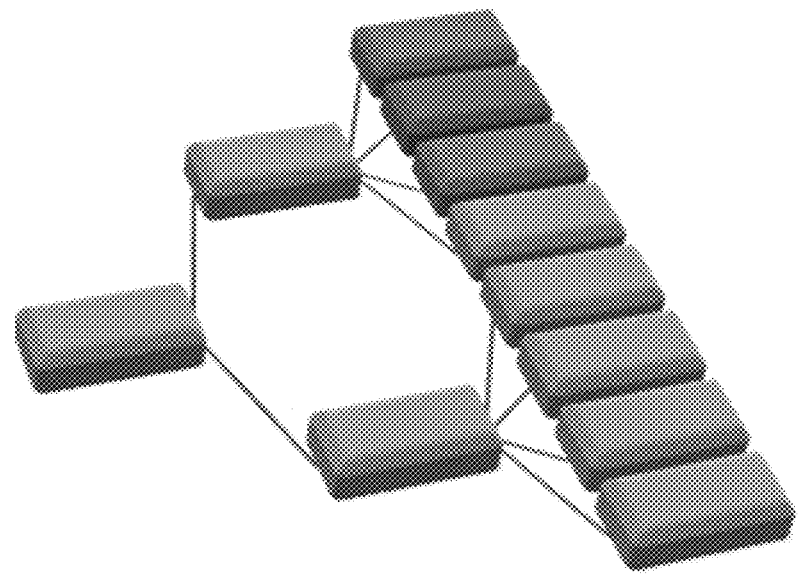

FIGS. 7A and 7B are block diagrams illustrating networks of optogenetic systems, with each rectangle representing a colony of biosensors, that enable can improve network scale and throughput in accordance with embodiments of the present technology.

FIG. 7A illustrates an example of the parallel decoding of sensors using two distinct frequencies of light (illustrated in red and blue in FIG. 7A). Herein, each sensor is genetically engineered to respond to a specific frequency of light; multiple sensors can be turned on and off in parallel, allowing the receiver to read more than one sensor at a time. Such a setup can advantageously improve the scale and throughput of the network, by allowing multiple readouts simultaneously.

FIG. 7B illustrates another example where multiple sensors can be turned on in parallel to observe data with redundancy. This redundancy in data can be used to improve reliability of data read. This framework also allows us to read multiple range of inputs. For example, the single rectangle to the left can be sensor that responds to coarse range and finer sensing range obtained by illuminating sensors individually.

Certain aspects of the technology described in the context of particular embodiments may be combined or eliminated in other embodiments. In addition, while advantages associated with some embodiments of the technology have been described in the context of some embodiments, other embodiments may also exhibit such advantages, and not all embodiments need necessarily exhibit such advantages to all within the scope of the present technology. Accordingly, the disclosure and associated technology can encompass other embodiments not expressly shown or described herein.

To the extent any materials incorporated by reference herein conflict with the present disclosure, the present disclosure controls.

Representative Examples

The following examples are provided to further illustrate embodiments of the present technology and are not to be interpreted as limiting the scope of the present technology. To the extent that certain embodiments or features thereof are mentioned, it is merely for purposes of illustration and, unless otherwise specified, is not intended to limit the present technology. One skilled in the art may develop equivalent means without the exercise of inventive capacity and without departing from the scope of the present technology. It will be understood that many variations can be made in the procedures herein described while still remaining within the bounds of the present technology. Such variations are intended to be included within the scope of the presently disclosed technology.

Without further description, it is believed that one of ordinary skill in the art may, using the preceding description and the following illustrative examples, make and utilize the agents of the present disclosure and practice the claimed methods. The following working examples are provided to facilitate the practice of the present disclosure and are not to be construed as limiting in any way the remainder of the disclosure. As such, embodiments of the presently disclosed technology are described in the following representative examples.

1. An optogenetic communication system, comprising a biosensor subsystem comprising a plurality of biosensors; a biotransmitter subsystem configured to produce an output molecule or alter an output property in response to the plurality of biosensors interacting with a plurality of stimulus molecules, the output property being associated with the output molecule, the plurality of biosensors, or the plurality of stimulus molecules; and an electronic receiver subsystem comprising an output detector, a processor, and a memory including instructions executable by the processor stored thereon, wherein the instructions upon execution by the processor, configure the processor to receive information from the output detector representative of sensing information conveyed by the biotransmitter subsystem, and process the information in digital form to detect one or more of the following the output property associated with the output molecule, a concentration associated with the output molecule, the output property associated with the plurality of biosensors, the output property associated with the plurality of stimulus molecules, a concentration of the plurality of biosensors, and a concentration of the plurality of stimulus molecules.

2. The system of example 1, wherein the output molecule comprises a light-emitting molecule.

3. The system of example 2, wherein processing the received information in digital form comprises performing a demodulation operation on an electrical signal corresponding to the intensity of the light produced by the light-emitting molecules.

4. The system of any of examples 1 to 3, wherein the biosensor subsystem further comprises an optogenetic system configured to produce the plurality of biosensors upon being optically triggered by a light beam with a predetermined wavelength.

5. The system of example 4, wherein the plurality of biosensors comprises a chimeric transcriptional activator Gal4dbd.ER.VP16 (GEV), the plurality of stimulus molecules comprises beta-estradiol molecules, wherein the light-emitting molecules comprise green fluorescent protein (GFP) molecules, and wherein the optogenetic system comprises a ZCRY2/CIB1AD optogenetic system.

6. The system of any of examples 1 to 3, wherein the biosensor and biotransmitter subsystems are implemented in units such as a microfluidic device comprising a plurality of regions, wherein each region produces a different granularity of biosensing detection in response to an incident light.

7. The system of example 6, wherein the plurality of regions is configured with different types of biosensors and different types of stimulus molecules.

8. The system of example 1, wherein the output property comprises a pH level, an electrical impedance, a level of molecular interaction between at least two of the output molecule, the plurality of biosensors, and the plurality of stimulus molecules.

9. A bio-electronic communication system, comprising a microfluidic device comprising a plurality of regions, wherein each region comprises a plurality of biosensors, wherein the plurality of biosensors in each region is associated with at least one distinct threshold for an optically-triggered production of light-emitting molecules, and wherein the production of the light-emitting molecules is based on a value associated with an information source and triggered by at least one light beam incident on one or more of the plurality of regions; a light detector configured to detect light received from one or more of the plurality of regions corresponding to a light intensity of the light-emitting molecules in that region and generate an electrical signal associated therewith; and a processor configured to process the electric signal and determine the value associated with the information source.

10. The system of example 9, wherein each region comprises a plurality of stimulus molecules and an optogenetic system, and wherein the light intensity of the light-emitting molecules is based on a ratio of the plurality of biosensors and the plurality of stimulus molecules.

11. The system of example 10, wherein a wavelength or an intensity of the incident light is configured based on the information source.

12. The system of example 10, wherein a population density of the plurality of biosensors and the plurality of stimulus molecules are configured based on the information source.

13. The system of example 10, wherein a type of the plurality of biosensors and a type of the plurality of stimulus molecules are configured based on the information source.

14. The system of example 9, wherein the light detector comprises one or more of a cellphone, a plate reader, or a microscope.

15. A bio-electronic communication method, comprising generating at least one light beam incident on one or more regions of a plurality of regions in a device, wherein each region comprises an optogenetic system to generate, upon interacting with the at least one light beam, a plurality of biosensors, wherein an interaction between the plurality of biosensors and a plurality of stimulus molecules in each region is associated with at least one distinct threshold for a production of an output molecule or an alteration of an output property associated with the output molecule, the plurality of biosensors, or the plurality of stimulus molecules; wherein the production of the output molecule or the alteration of the output property is based on a value associated with an information source; detecting an output received from one or more of the plurality of regions corresponding to the output molecule or the output property in that region and generating an electric signal associated therewith; and processing the electrical signal to determine the value associated with the information source.

16. A bio-electronic system comprising one or more light-sensitive biosensors, one or more biotransmitters, one or more electronic receivers, and one or more external opto-electronic stimuli configured to generate an external optical signal, thereby to turn on the one or more biosensors.

17. The bio-electronic system of example 16, wherein the biosensor is an estrogen sensor expressed by yeast.

18. The bio-electronic system of example 16, wherein the biosensor is GEV sensor.

While the present disclosure contains many specifics, these should not be construed as limitations on the scope of any invention or of what may be claimed, but rather as descriptions of features that may be specific to particular embodiments of particular inventions. Certain features of the present technology in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in embodiments of the present technology should not be understood as requiring such separation in all embodiments.

Only a few implementations and examples are described and other implementations, enhancements and variations can be made in accordance with the present technology.

REFERENCES

1. Adeniran et al. Yeast-based biosensors: design and applications. *FEMS Yeast Res* 15(1):1-15, 2015.
2. McIsaac et al. Fast-acting and nearly gratuitous induction of gene expression and protein depletion in *Saccharomyces cerevisiae*. *Mol Biol Cell* 22(22):4447-4459, 2011.
3. My An-Adirekkun et al. A yeast optogenetic toolkit (yOTK) for gene expression control in *Saccharomyces cerevisiae*. *Biotechnol Bioeng* 117(3):886-893, 2020.
4. Melendez et al. Real-time optogenetic control of intracellular protein concentration in microbial cell cultures. *Integr Biol (Camb)*, 6(3):366-372, 2014.
5. Stewart & McClean. Design and implementation of an automated illuminating, culturing, and sampling system for microbial optogenetic applications. *J Vis Exp* (120): 54894, 2017.
6. Metzger et al. The human oestrogen receptor functions in yeast. *Nature,* 334(6177):31-36, 1988.
7. Sanseverino et al. Screening of potentially hormonally active chemicals using bioluminescent yeast bioreporters. *Toxicol Sci* 107(1):122-134, 2009.
8. Rajasärkkä et al. Developing a compound specific receptor for bisphenol a by directed evolution of human estrogen receptor α. *Biotechnol Bioeng* 108(11):2526-2534, 2011.
9. Gore et al. EDC-2: The Endocrine Society's second scientific statement on endocrine-disrupting chemicals. *Endocr Rev* 36(6):E1-E150, 2015.
10. Kennedy et al. Rapid blue-light-mediated induction of protein interactions in living cells. *Nat Methods* 7(12): 973-975, 2010.

11. Farsad et al. A comprehensive survey of recent advancements in molecular communication. *IEEE Communications Surveys & Tutorials* 18(3):1887-1919, 2016.
12. Bhuvana Krishnaswamy. Algorithms for molecular communication networks. PhD. thesis, Georgia Institute of Technology, 2018.
13. Ian F Akyildiz, Massimiliano Pierobon, and Sasitharan Balasubramaniam. Moving forward with molecular communication: from theory to human health applications. *Proceedings of the IEEE,* 107(5):858-865, 2019.
14. Slomovic et al. Synthetic biology devices for in vitro and in vivo diagnostics. *Proc Natl Acad Sci USA* 112(47): 14429-14435, 2015.
15. Bryan C Dickinson Krysten A Jones, Julia Zinkus-Boltz. Recent advances in developing and applying biosensors for synthetic biology. *Nano Futures,* 2019.
16. Snoek et al. Evolution-guided engineering of small-molecule biosensors. *Nucleic Acids Res* 48(1):e3, 2020.
17. Boyden. A history of optogenetics: the development of tools for controlling brain circuits with light. *F1000 Biol Rep* 3:11, 2011.
18. Ford & Silver. Synthetic biology expands chemical control of microorganisms. *Curr Opin Chem Biol* 28:20-28, 2015.
19. Prindle et al. A sensing array of radically coupled genetic 'biopixels'. *Nature* 481(7379):39-44, 2012.
20. Moser et al. *ACS Synth Biol* 2(10):614-624, 2013.
21. Trang et al. Bacterial bioassay for rapid and accurate analysis of arsenic in highly variable groundwater samples. *Environ Sci Technol* 39(19):7625-7630, 2005.
22. van der Meer * Belkin. Where microbiology meets microengineering: design and applications of reporter bacteria. *Nat Rev Microbiol* 8(7):511-522, 2010.
23. Loessner et al. Construction of luciferase reporter bacteriophage A511::luxAB for rapid and sensitive detection of viable *Listeria* cells. *Appl EnvironMicrobiol* 62(4): 1133-1140, 1996.
24. Nguyen et al. Detection of *Bacillus anthracis* spores from environmental water using bioluminescent reporter phage. *J Appl Microbiol* 123(5):1184-1193, 2017.
25. Anderson et al. Environmentally controlled invasion of cancer cells by engineered bacteria. *J Mol Biol* 355(4): 619-627, 2006.
26. Chien et al. Advances in bacterial cancer therapies using synthetic biology. *Curr Opin Syst Biol* 5:1-8, 2017.
27. Caitlin Marie Austin. Dynamics of molecular communication in bacteria within microfluidic environments. PhD thesis, Georgia Institute of Technology, 2016.
28. Tamsir et al. Robust multicellular computing using genetically encoded nor gates and chemical 'wires'. *Nature* 469(7329):212-215, 2011.
29. Siuti et al. Synthetic circuits integrating logic and memory in living cells. *Nature Biotechnol* 31(5):448-452, 2013.
30. Khalil & Collins. Synthetic biology: applications come of age. *Nat Rev Genet* 11(5):367-379, 2010.
31. Marchisio & Stelling. Automatic design of digital synthetic gene circuits. *PLoS Comput Biol* 7(2):e1001083, 2011.
32. Xiang et al. Scaling up genetic circuit design for cellular computing: advances and prospects. *Nat Comput* 17(4): 833-853, 2018.
33. Lin et al. Multiple advanced logic gates made of DNA-Ag nanocluster and the application for intelligent detection of pathogenic bacterial genes. *Chem Sci* 9(7):1774-1781, 2018.
34. Bradley et al. Recognizing and engineering digital-like logic gates and switches in gene regulatory networks. *Curr Opin Microbiol* 33:74-82, 2016.
35. Miyamoto et al. Synthesizing biomolecule-based Boolean logic gates. *ACS Synth Biol* 2(2):72-82, 2013.
36. Luo et al. Biofabrication of stratified biofilm mimics for observation and control of bacterial signaling. *Biomaterials* 33(20):5136-5143, 2012.
37. Luo et al. Distal modulation of bacterial cell-cell signalling in a synthetic ecosystem using partitioned microfluidics. *Lab Chip* 15(8):1842-1851, 2015.
38. Pierobon & Akyildiz. A physical end-to-end model for molecular communication in nanonetworks. *IEEE Journal on Selected Areas in Communications* 28(4):602-611, 2010.
39. Pierobon & Akyildiz. Information capacity of diffusion based molecular communication in nanonetworks. 2011 *Proceedings IEEE INFOCOM* 506-510, 2011.
40. Farsad et al. Capacity limits of diffusion-based molecular timing channels with finite particle lifetime. *IEEE Transactions on Molecular, Biological and Multi-Scale Communications* 4(2):88-106, 2018.
41. Kim et al. An experimentally validated channel model for molecular communication systems. *IEEE Access,* 7:81849-81858, 2019.
42. Guo et al. Molecular communications: Channel model and physical layer techniques. *IEEE Wireless Communications* 23 (4):120-127, 2016.
43. Satoshi Hiyama and Yuki Moritani. Molecular communication: Harnessing biochemical materials to engineer biomimetic communication systems. *Nano Communication Networks,* 1(1):20-30, 2010.
44. LaVan et al. Small-scale systems for in vivo drug delivery. *Nat Biotechnol* 21(10):1184-1191, 2003.
45. Mehmet S Kuran, Huseyin Birkan Yilmaz, Tuna Tugcu, and Ian F Akyildiz. Modulation techniques for communication via diffusion in nanonetworks. In 2011 *IEEE international conference on communications (ICC)*, pages 1-5. IEEE, 2011.
46. Krishnaswamy et al. Time-elapse communication: Bacterial communication on a microfluidic chip. *IEEE Transactions on Communications,* 61(12):5139-5151, 2013.
47. Fang et al. Symbol-by-symbol maximum likelihood detection for cooperative molecular communication. *IEEE Transactions on Communications* 67(7):4885-4899, 2019.
48. Mai et al. Event detection in molecular communication networks with anomalous diffusion. *IEEE Communications Letters,* 21(6):1249-1252, 2017.
49. Vasconcelos et al. A continuous-time decision-making model for bacterial growth via quorum sensing: theory and evidence. *NANOCOM '19: Proceedings of the Sixth Annual ACM International Conference on Nanoscale Computing and Communication* 5:1-6, 2019.
50. Massimiliano Pierobon. A systems-theoretic model of a biological circuit for molecular communication in nanonetworks. *Nano Comm. Networks,* 2014.
51. Krishnaswamy et al. ADMA: Amplitude-division multiple access for bacterial communication networks. *IEEE Transactions on Molecular, Biological and Multi-Scale Communications* 3(3):134-149, 2017.
52. Baris Atakan and Ozgur B Akan. Single and multiple-access channel capacity in molecular nanonetworks. In *International Conference on Nano-Networks,* 2009.
53. Moore & Nakano. Addressing by beacon distances using molecular communication. *Nano Communication Networks* 2(2-3):161-173, 2011.

54. James F Kurose and Keith W Ross. *Computer Networking*, 1991.
55. Balasubramaniam et al. Opportunistic routing through conjugation in bacteria communication nanonetwork. *Nano Communication Networks* 3 (1):36-45, 2012.
56. Einolghozati et al. Decode and forward relaying in diffusion-based molecular communication between two populations of biological agents. 2014 *IEEE International Conference on Communications* 3975-3980, 2014.
57. Evgeny Katz. Biomolecular information processing: from logic systems to smart sensors and actuators. *John Wiley & Sons*, 2013.
58. He et al. Improving reliability performance of diffusion-based molecular communication with adaptive threshold variation algorithm. *International Journal of Communication Systems* 29(18), 2016.
59. Shih et al. Channel codes for mitigating intersymbol interference in diffusion-based molecular communications. 2012 *IEEE Global Communications Conference (GLOBECOM)* 4228-4232, 2012.
60. Gerhardt et al. An open-hardware platform for optogenetics and photobiology. *Sci Rep* 6:35363, 2016.
61. Bugaj & Lim. High-throughput multicolor optogenetics in microwell plates. *Nat Protoc* 14(7):2205-2228, 2019.
62. Sweeney et al. Easy calibration of the light plate apparatus for optogenetic experiments. *MethodsX* 6:1480-1488, 2019.
63. Maysam Mansouri, Tobias Strittmatter, and Martin Fussenegger. Light-controlled mammalian cells and their therapeutic applications in synthetic biology. *Advanced Science (Weinheim, Baden-Wurttemberg, Germany)*, 2019.
64. Repina et al. At light speed: Advances in optogenetic systems for regulating cell signaling and behavior. *Annu Rev Chem Biomol Eng* 8:13-39, 2017.
65. Kolar et al. Optobase: A web platform for molecular optogenetics. *ACS Synth Biol* 7(7):1825-1828, 2018.
66. Zhang et al. Light-mediated kinetic control reveals the temporal effect of the raf/mek/erk pathway in pc12 cell neurite outgrowth. *PLoS One*, 9(3):e92917, 2014.
67. Liu et al. Programming bacteria with light-sensors and applications in synthetic biology. *Front Microbiol* 9:2692, 2018.
68. Salinas et al. Optogenetic switches for light-controlled gene expression in yeast. *Appl Microbiol Biotechnol* 101(7):2629-2640, 2017.
69. Tingting Xu, Anna Young, Jasleen Narula, Gary Sayler, and Steven Ripp. Highthroughput analysis of endocrine-disrupting compounds using blyes and blyas bioluminescent yeast bioassays. In *Bioluminescent Imaging*. Springer, 2020.
70. Shiizaki et al. Establishment of yeast reporter assay systems to detect ligands of thyroid hormone receptors alpha and beta. *Toxicol In Vitro*, 24(2):638-644, 2010.
71. Mushnikov et al. Inducible asymmetric cell division and cell differentiation in a bacterium. *Nat Chem Biol*, 15(9): 925-931, 2019.
72. Molinari et al. A synthetic system for asymmetric cell division in *Escherichia coli*. *Nat Chem Biol*, 15(9):917-924, 2019.
73. Benzinger & Khammash. Pulsatile inputs achieve tunable attenuation of gene expression variability and graded multi-gene regulation. *Nat Commun*, 9(1):3521, 2018.
74. Darlington et al. Dynamic allocation of orthogonal ribosomes facilitates uncoupling of co-expressed genes. *Nat Commun*, 9(1):695, 2018.
75. Dai et al. Colour compound lenses for a portable fluorescence microscope. *Light Sci Appl*, 8:75, 2019.
76. Grebenstein et al. Biological optical-to-chemical signal conversion interface: A small-scale modulator for molecular communications. *IEEE Transactions on NanoBioscience*, 18(1):31-42, 2019.
77. Russell et al. Non-model model organisms. *BMC Biol* 15(1):55, 2017.
78. Yan & Fong. Challenges and advances for genetic engineering of non-model bacteria and uses in consolidated bioprocessing. *Front Microbiol* 8:2060, 2017.

The invention claimed is:

1. An optogenetic communication system, comprising:
a biosensor subsystem comprising a plurality of biosensors;
a biotransmitter subsystem configured to produce an output molecule or alter an output property in response to the plurality of biosensors interacting with a plurality of stimulus molecules, the output property being associated with the output molecule, the plurality of biosensors, or the plurality of stimulus molecules; and
an electronic receiver subsystem comprising:
an output detector,
a processor, and
a memory including instructions executable by the processor stored thereon, wherein the instructions, upon execution by the processor, configure the processor to:
receive information from the output detector representative of sensing information conveyed by the biotransmitter subsystem, and process the information in digital form to detect one or more of the following:
the output property associated with the output molecule,
a concentration associated with the output molecule,
the output property associated with the plurality of biosensors,
the output property associated with the plurality of stimulus molecules,
a concentration of the plurality of biosensors, or
a concentration of the plurality of stimulus molecules.

2. The system of claim 1, wherein the output molecule comprises a light-emitting molecule.

3. The system of claim 2, wherein processing the received information in digital form comprises:
performing a demodulation operation on an electrical signal corresponding to an intensity of the light produced by the light-emitting molecules.

4. The system of claim 2, wherein the biosensor subsystem further comprises an optogenetic system configured to produce the plurality of biosensors upon being optically triggered by a light beam with a predetermined wavelength.

5. The system of claim 4, wherein the plurality of biosensors comprises a chimeric transcriptional activator Gal4dbd.ER.VP16 (GEV),
the plurality of stimulus molecules comprises beta-estradiol molecules,
wherein the light-emitting molecules comprise green fluorescent protein (GFP) molecules, and
wherein the optogenetic system comprises a ZCRY2/CIB1AD optogenetic system.

6. The system of claim 1, wherein the biosensor and biotransmitter subsystems are implemented using a microfluidic device comprising a plurality of regions, wherein each of the plurality of regions produces a different granularity of biosensing detection in response to an incident light.

7. The system of claim 1, wherein the biosensor and biotransmitter subsystems are implemented using a microfluidic device comprising a plurality of regions,
wherein each of the plurality of regions is configured with a different type of biosensor and a different type of stimulus molecule.

8. The system of claim 1, wherein the output property comprises a pH level, or an electrical impedance.

9. The system of claim 1, wherein the output property comprises a level of molecular interaction between any combination of at least two of the following: the output molecule, the plurality of biosensors, or the plurality of stimulus molecules.

10. The system of claim 5, wherein each of the plurality of biosensors is expressed by yeast.

11. The system of claim 6, wherein each of the plurality of biosensors is associated with a respective region of the plurality of regions, and
wherein the biotransmitter subsystem is configured to implement, for each respective region of the plurality of regions, a distinct threshold of a plurality of distinct thresholds, such that, for each of the plurality of regions, and
wherein the biotransmitter subsystem is further configured to produce the output molecule or alter the output property, for each region, in response to a value of a signal measured by the biosensor subsystem satisfying the distinct threshold associated with the region, thereby indicating that the region has been activated.

12. The system of claim 11, wherein the information from the output detector representative of sensing information conveyed by the biotransmitter subsystem comprises:
an indication, for each region of the plurality of regions, of whether the region was activated, and
wherein processing the received information in digital form comprises:
determining the value of the signal based on which of the plurality of regions was activated and which of the plurality of regions was not activated.

13. The system of claim 1, wherein the biosensor subsystem further comprises a second plurality of biosensors,
the biotransmitter subsystem is configured to produce a second output molecule or alter a second output property in response to the second plurality of biosensors interacting with a second plurality of stimulus molecules, the second output property being associated with the second output molecule, the second plurality of biosensors, or the second plurality of stimulus molecules; and
wherein the instructions, upon execution by the processor, further configure the processor to:
receive information from the output detector representative of sensing information conveyed by the biotransmitter subsystem, and process the information in digital form to detect one or more of the following:
the second output property associated with the output molecule,
a concentration associated with the second output molecule,
the second output property associated with the second plurality of biosensors,
the second output property associated with the second plurality of stimulus molecules,
a concentration of the second plurality of biosensors, or
a concentration of the second plurality of stimulus molecules.

14. The system of claim 13, wherein activity of the plurality of biosensors is modulated using a first trigger, and activity of the second plurality of biosensors is modulated using a second trigger that is different from the first trigger, and
wherein the second output molecule or second output property is the same as the output molecule or second output property, and the second plurality of biosensors or plurality of biosensors is addressed based on a timing of when the first trigger or second trigger was applied to activate the plurality of biosensors or the second plurality of biosensors.

15. An optogenetic communication method, comprising:
generating, using an output detector of an electronic receiver subsystem of an optogenetic communication system, information representative of sensing information conveyed by a biotransmitter subsystem of the optogenetic communication system,
wherein the optogenetic communication system comprises:
a biosensor subsystem comprising a plurality of biosensors;
the biotransmitter subsystem configured to produce an output molecule or alter an output property in response to the plurality of biosensors interacting with a plurality of stimulus molecules, the output property being associated with the output molecule, the plurality of biosensors, or the plurality of stimulus molecules; and
an electronic receiver subsystem comprising:
an output detector,
a memory, and
a processor configured to execute instructions included on the memory;
receiving, using the processor, the information representative of sensing information conveyed by the biotransmitter subsystem; and
processing the information in digital form to detect one or more of the following:
the output property associated with the output molecule,
a concentration associated with the output molecule,
the output property associated with the plurality of biosensors,
the output property associated with the plurality of stimulus molecules,
a concentration of the plurality of biosensors, or
a concentration of the plurality of stimulus molecules.

16. The method of claim 15, wherein the output molecule comprises a light-emitting molecule.

17. The method of claim 16, wherein processing the information in digital form comprises:
performing, using the processor, a demodulation operation on an electrical signal corresponding to an intensity of the light produced by the light-emitting molecules.

18. The method of claim 15, wherein the output property comprises a pH level, or an electrical impedance.

19. A non-transitory computer-readable medium containing computer executable instructions that, when executed by a processor, configure the processor to perform an optogenetic communication method, the method comprising:

generating, using an output detector of an electronic receiver subsystem of an optogenetic communication system, information representative of sensing information conveyed by a biotransmitter subsystem of the optogenetic communication system,
wherein the optogenetic communication system comprises:
   a biosensor subsystem comprising a plurality of biosensors;
   the biotransmitter subsystem configured to produce an output molecule or alter an output property in response to the plurality of biosensors interacting with a plurality of stimulus molecules, the output property being associated with the output molecule, the plurality of biosensors, or the plurality of stimulus molecules; and
   an electronic receiver subsystem comprising:
      an output detector,
      a memory, and
      a processor configured to execute instructions included on the memory;
receiving, using the processor, the information representative of sensing information conveyed by the biotransmitter subsystem; and
processing the information in digital form to detect one or more of the following:
   the output property associated with the output molecule,
   a concentration associated with the output molecule,
   the output property associated with the plurality of biosensors,
   the output property associated with the plurality of stimulus molecules,
   a concentration of the plurality of biosensors, or
   a concentration of the plurality of stimulus molecules.

* * * * *